US009844029B2

(12) United States Patent
Suzuki et al.

(10) Patent No.: US 9,844,029 B2
(45) Date of Patent: Dec. 12, 2017

(54) ACK/NACK PROCESSING FOR A MOBILE STATION DEVICE, BASE STATION DEVICE, WIRELESS COMMUNICATION SYSTEM, WIRELESS COMMUNICATION METHOD, AND INTEGRATED CIRCUIT

(75) Inventors: Shoichi Suzuki, Osaka (JP); Tatsushi Aiba, Osaka (JP); Yosuke Akimoto, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 576 days.

(21) Appl. No.: 13/884,002

(22) PCT Filed: Nov. 7, 2011

(86) PCT No.: PCT/JP2011/075533
§ 371 (c)(1),
(2), (4) Date: Jun. 20, 2013

(87) PCT Pub. No.: WO2012/063754
PCT Pub. Date: May 18, 2012

(65) Prior Publication Data
US 2013/0265963 A1 Oct. 10, 2013

(30) Foreign Application Priority Data
Nov. 9, 2010 (JP) .................... 2010-250929

(51) Int. Cl.
*H04W 72/04* (2009.01)
*H04L 1/00* (2006.01)
(Continued)

(52) U.S. Cl.
CPC ........... *H04W 72/04* (2013.01); *H04L 1/0073* (2013.01); *H04L 1/1671* (2013.01);
(Continued)

(58) Field of Classification Search
CPC ... H04L 1/0057; H04L 1/0073; H04L 1/1671; H04L 1/1861; H04L 5/001; H04L 27/20; H04L 27/2601; H04W 72/04
See application file for complete search history.

(56) References Cited

U.S. PATENT DOCUMENTS

2002/0172199 A1* 11/2002 Scott ................... G06F 12/1072
370/389
2004/0177306 A1* 9/2004 Hiraki ................... H04L 1/0003
714/748
(Continued)

FOREIGN PATENT DOCUMENTS

EP 2 760 171 A2 7/2014
JP 2010-252257 A 11/2010

OTHER PUBLICATIONS

"ACK/NACK transmission schemes for TDD in LTE-A," 3GPP TSG RAN WG1 Meeting #62bis R1-105246, Huawei, Oct. 11-15, 2010.
(Continued)

*Primary Examiner* — Jenee Holland
(74) *Attorney, Agent, or Firm* — Birch, Stewart, Kolasch & Birch, LLP

(57) ABSTRACT

A mobile station device executes processing on uplink control information by effectively using uplink resources when transmitting the uplink control information. The mobile station device generates a plurality of ACK/NACK sequences by interleaving and dividing ACKs/NACKs for a plurality of cells in a plurality of subframes, and separately encodes the plurality of ACK/NACK sequences. Also, the mobile station device interleaves a plurality of ACKs/NACKs and a scheduling request together.

14 Claims, 14 Drawing Sheets

(51) Int. Cl.
*H04L 5/00* (2006.01)
*H04L 1/18* (2006.01)
*H04L 27/26* (2006.01)
*H04L 1/16* (2006.01)
*H04L 27/20* (2006.01)

(52) U.S. Cl.
CPC ............ *H04L 1/1861* (2013.01); *H04L 5/001* (2013.01); *H04L 27/20* (2013.01); *H04L 27/2601* (2013.01); *H04L 1/0057* (2013.01); *H04L 1/0071* (2013.01)

(56) References Cited

U.S. PATENT DOCUMENTS

| | | | | |
|---|---|---|---|---|
| 2005/0249162 | A1* | 11/2005 | Kim | H04B 7/0491 370/333 |
| 2009/0092118 | A1* | 4/2009 | Naka | H04L 1/0071 370/343 |
| 2009/0109917 | A1* | 4/2009 | Pajukoski | H04L 1/0025 370/329 |
| 2009/0161611 | A1* | 6/2009 | Kuroda | H04B 7/2656 370/329 |
| 2009/0245284 | A1* | 10/2009 | Xu | H04L 1/0028 370/474 |
| 2010/0035555 | A1* | 2/2010 | Bala | H04B 7/024 455/63.1 |
| 2010/0150206 | A1* | 6/2010 | Futagi | H04L 5/0057 375/130 |
| 2010/0195629 | A1* | 8/2010 | Chen | H04L 1/1664 370/336 |
| 2010/0322114 | A1* | 12/2010 | Li et al. | 370/329 |
| 2011/0235619 | A1* | 9/2011 | Chong | H04L 1/0041 370/335 |
| 2011/0249578 | A1* | 10/2011 | Nayeb Nazar et al. | 370/252 |
| 2012/0039275 | A1* | 2/2012 | Chen | H04L 1/1607 370/329 |
| 2012/0039279 | A1* | 2/2012 | Chen | H04L 1/1861 370/329 |
| 2012/0113907 | A1* | 5/2012 | Baldemair | H04W 52/146 370/329 |

OTHER PUBLICATIONS

"Large ACK/NACK payload in support of CA in TDD," 3GPP TSG RAN WG1 Meeting #62bis R1-105714, ZTE, Oct. 11-15, 2010, pp. 1-6.

"Simultaneous transmission of Scheduling request indicator and ACK/NACK information for LTE-Advanced," 3GPP TSG RAN WG1 Meeting #62bis R1-105481, Panasonic, Oct. 11-15, 2010, pp. 1-5.

"UL ACK/NAK Bundling Ways in LTE-A TDD," 3GPP TSG RAN WG1 Meeting #62bis R1-105522, Nokia, Oct. 11-15, 2010.

"UL ACK/NAK Transmission for TDD in Rel-10," 3GPP TSG RAN WG1 Meeting #62bis R1-105151, CATT, Oct. 11-15, 2010.

"Way forward on Supporting ACK/NAK Payload Larger than 11 Bits in Rel-10 TDD," TSG-RAN WG1 Meeting #62bis R1-105776, Oct. 11-15, 2010.

International Search Report issued in PCT/JP2011/075533, dated Jan. 31, 2012.

* cited by examiner

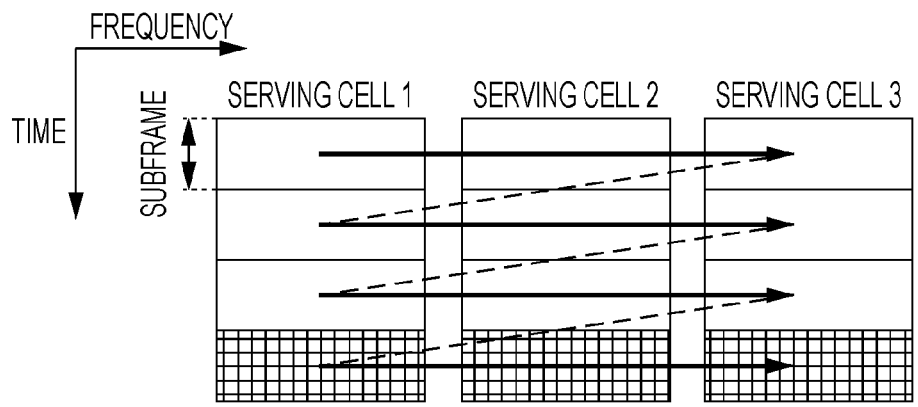

FIG. 12

| i | Mi,0 | Mi,1 | Mi,2 | Mi,3 | Mi,4 | Mi,5 | Mi,6 | Mi,7 | Mi,8 | Mi,9 | Mi,10 |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

ACK/NACK PROCESSING FOR A MOBILE STATION DEVICE, BASE STATION DEVICE, WIRELESS COMMUNICATION SYSTEM, WIRELESS COMMUNICATION METHOD, AND INTEGRATED CIRCUIT

TECHNICAL FIELD

The present invention relates to a mobile station device, a base station device, a wireless communication system, a wireless communication method, and an integrated circuit.

BACKGROUND ART

An evolution of radio access schemes and radio networks for cellular mobile communication (hereinafter referred to as "Long Term Evolution (LTE)" or "Evolved Universal Terrestrial Radio Access (EUTRA)") is being studied by the 3rd Generation Partnership Project (3GPP). In LTE, the Orthogonal Frequency Division Multiplexing (OFDM) scheme, which is a multi-carrier transmission scheme, is used as a communication scheme for wireless communication from a base station device to a mobile station device (downlink). Also, the Single-Carrier Frequency Division Multiple Access (SC-FDMA) scheme, which is a single-carrier transmission scheme, is used as a communication scheme for wireless communication from a mobile station device to a base station device (uplink).

In LTE, an ACK (Acknowledgement)/NACK (Negative Acknowledgement) (also referred to as HARQ-ACK), which indicates whether or not a mobile station device has succeeded in decoding downlink data received on the Physical Downlink Shared Channel (PDSCH), is transmitted on the Physical Uplink Control Channel (PUCCH) or Physical Uplink Shared Channel (PUSCH). In a case where the mobile station device is not allocated radio resources for the PUSCH when transmitting an ACK/NACK, the ACK/NACK is transmitted on the PUCCH. In a case where the mobile station device is allocated radio resources for the PUSCH when transmitting an ACK/NACK, the ACK/NACK is transmitted on the PUSCH. In LTE, in a case where an ACK/NACK of 3 bits or more is to be transmitted on the PUSCH, the ACK/NACK is encoded using Reed-Muller code to generate an encoded ACK/NACK bit sequence of 32 bits.

In 3GPP, studies are being performed to allow radio access schemes and radio networks which realize higher-speed data communication using a broader frequency band than that of LTE (hereinafter referred to as "Long Term Evolution-Advanced (LTE-A)" or "Advanced Evolved Universal Terrestrial Radio Access (A-EUTRA)") to have backward compatibility with LTE. That is, a base station device of LTE-A is capable of simultaneously performing wireless communication with mobile station devices of both LTE-A and LTE, and a mobile station device of LTE-A is capable of performing wireless communication with base station devices of both LTE-A and LTE. The channel structure of LTE-A is the same as that of LTE.

In LTE-A, there is suggested a-technology in which a plurality of frequency bands having the same channel structure as LTE. (hereinafter referred to as "component carriers (CCs)") or a plurality of cells are used as one frequency band (broad frequency band). This is also referred to as, for example, carrier aggregation or cell aggregation. For example, in communication using frequency band aggregation, a base station device is capable of simultaneously transmitting a plurality of Physical Downlink Control Channels (PDCCHs) and a plurality of Physical Downlink Shared Channels (PDSCHs) to a mobile station device using one or a plurality of downlink component carriers (DL CCs) or cells, and the mobile station device is capable of simultaneously receiving the plurality of PDCCHs and PDSCHs.

In LTE-A, studies are being performed on dividing ACKs/NACKs into two ACK/NACK segments and separately encoding the two ACK/NACK segments using Reed-Muller code in the case of transmitting ACKs/NACKs which are larger than 11 bits and smaller than 22 bits using the Physical Uplink Control Channel (PUCCH) (NPL 1).

NPL 2 suggests a technology in which a mobile station device executes spatial bundling on individual ACKs/NACKs for a plurality of pieces of downlink data which have been multiplexed to a single PDSCH by a base station device using spatial domain multiplexing (SDM), thereby generating one ACK/NACK. Here, bundling of ACKs/NACKs (ACK/NACK bundling) means, for example, a mobile station device executes logical AND operation on a plurality of ACKs/NACKs (for individual PDSCH transmissions) to generate a smaller number of ACKs/NACKs (for example, expressed by 1 bit).

For example, in a case where all of a plurality of ACKs/NACKs to be bundled are ACKs, a mobile station device generates one ACK as bundled ACKs/NACKs and transmits the ACK to a base station device. Also, for example, in a case where a plurality of ACKs/NACKs to be bundled include at least one NACK, the mobile station device generates one NACK as bundled ACKs/NACKs and transmits the NACK to the base station device. If the base station device receives ACKs bundled by the mobile station device, the base station device determines that all of the plurality of ACKs/NACKs corresponding to bundled ACKs/NACKs are ACKs. Also, if the base station device receives NACKs bundled by the mobile station device, the base station device determines that at least one NACK is included in the plurality of ACKs/NACKs corresponding to bundled ACKs/NACKs.

NPL 3 suggests a technology in which a mobile station device executes spatial bundling on ACKs/NACKs corresponding to a plurality of pieces of downlink data, and also executes time-domain bundling and/or component-carrier-domain bundling on the ACKs/NACKs on which spatial bundling has been executed. Here, time-domain bundling means that a mobile station device executes ACK/NACK bundling on ACKs/NACKs for the PDSCH which have been respectively received in a plurality of subframes in a certain cell. Component-carrier-domain bundling means that a mobile station device executes ACK/NACK bundling on ACKs/NACKs for the PDSCH which have been respectively received in a plurality of cells (component carriers) in a certain subframe.

CITATION LIST

Non Patent Literature

NPL 1: "Way forward on Supporting ACK/NACK Payload Larger than 11 Bits in Rel-10 TDD", 3GPP TSG RAN WG1 Meeting #62bis, R1-105776, Oct. 11-15, 2010.

NPL 2: "UL ACK/NACK Transmission for TDD in Rel-10", 3GPP TSG RAN WG 1 Meeting #62bis, R1-105151, Oct. 11-15, 2010.

NPL 3: "UL ACK/NACK Bundling Ways in LTE-A TDD", 3GPP TSG RAN WG 1 Meeting #62bis, R1-105522, Oct. 11-15, 2010.

SUMMARY OF INVENTION

Technical Problem

In the related art, however, there is no detailed description of processing which is performed when a mobile station device transmits uplink control information (ACKs/NACKs) corresponding to a plurality of cells in a plurality of subframes. For example, when a mobile station device divides uplink control information (ACKs/NACKs) corresponding to a plurality of cells in a plurality of subframes and encodes the individual pieces of uplink control information (ACKs/NACKs) generated through division, it is necessary to consider the quality of the individual pieces of uplink control information (ACKs/NACKs). Also, for example, when the mobile station device encodes the uplink control information (ACKs/NACKs) corresponding to a plurality of cells in a plurality of subframes, it is necessary to consider an appropriate amount of information for the channel on which the uplink control information (ACKs/NACKs) is transmitted. That is, the related art involves a problem that a mobile station device is incapable of executing processing on uplink control information by effectively using uplink resources.

The present invention has been made in view of the above-described points, and an object thereof is to provide a mobile station device, a base station device, a wireless communication system, a wireless communication method, and an integrated circuit that enable a mobile station device to execute processing on uplink control information by effectively using uplink resources when transmitting the uplink control information.

Solution to Problem (1) In order to achieve the above-described object, the present invention takes the following measures. That is, a mobile station device according to the present invention is a mobile station device that communicates with a base station device using a plurality of cells which are set by the base station device. The mobile station device generates a plurality of ACK/NACK sequences by interleaving and dividing a plurality of ACKs/NACKs for a plurality of cells in a plurality of subframes, and separately encodes the plurality of ACK/NACK sequences.

(2) The mobile station device according to the present invention interleaves the plurality of ACKs/NACKs and a scheduling request together.

(3) A mobile station device according to the present invention is a mobile station device that transmits on a single physical channel, to a base station device, ACKs or NACKs corresponding to individual transport blocks received in one or a plurality of subframes in a plurality of cells. A transmission mode is set for at least one of the plurality of cells by the base station device, the transmission mode enabling two transport blocks to be transmitted in one subframe using spatial multiplexing. The mobile station device determines, in accordance with the number of bits of the ACKs or NACKs, whether or not to execute spatial bundling on ACKs or NACKs for the cell in the transmission mode. In case of receiving one transport block in the cell in the transmission mode in a certain subframe, if having determined not to execute spatial bundling on the ACKs or NACKs, the mobile station device generates an ACK or a NACK in response to the one received transport block and generates a NACK in response to a transport block which has not been received, and, if having determined to execute spatial bundling on the ACKs or NACKs, the mobile station device generates an ACK or a NACK in response to the one received transport block and does not generate a NACK in response to a transport block which has not been received.

(4) A base station device according to the present invention is a base station device that communicates with a mobile station device using a plurality of cells which are set for the mobile station device. The base station device receives a signal which is generated from a plurality of encoded ACK/NACK sequences and which is transmitted on a physical uplink channel. The plurality of encoded ACK/NACK sequences are generated by, with the mobile station device, interleaving and dividing a plurality of ACKs/NACKs for a plurality of cells in a plurality of subframes to generate a plurality of ACK/NACK sequences, and separately encoding the plurality of ACK/NACK sequences.

(5) In the base station device according to the present invention, the plurality of ACK/NACK sequences are generated by interleaving and separating the plurality of ACKs/NACKs and a scheduling request together.

(6) A base station device according to the present invention is a base station device that receives on a single physical channel, from a mobile station device, ACKs or NACKs corresponding to individual transport blocks transmitted in one or a plurality of subframes in a plurality of cells. The base station device sets a transmission mode for at least one of the plurality of cells, the transmission mode enabling two transport blocks to be transmitted in one subframe using spatial multiplexing. In case of transmitting one transport block to the mobile station device in the cell in the transmission mode in a certain subframe, if it is determined that spatial bundling is not to be executed on the ACKs or NACKs by the mobile station device in accordance with the number of bits of the ACKs or NACKs, the base station device receives, from the mobile station device, a signal generated from an ACK or a NACK generated by the mobile station device in response to the one transmitted transport block and a NACK generated by the mobile station device in response to a transport block which has not been received by the mobile station device, and, if it is determined that spatial bundling is to be executed on the ACKs or NACKs by the mobile station device in accordance with the number of bits of the ACKs or NACKs, the base station device receives, from the mobile station device, a signal generated from a result obtained by executing bundling on an ACK or a NACK generated by the mobile station device in response to the one transmitted transport block and a signal other than a NACK corresponding to a transport block which has not been received.

(7) A wireless communication system according to the present invention is a wireless communication system in which a mobile station device and a base station device communicate with each other using a plurality of cells which are set by the base station device. The mobile station device generates a plurality of ACK/NACK sequences by interleaving and dividing a plurality of ACKs/NACKs for a plurality of cells in a plurality of subframes, and separately encodes the plurality of ACK/NACK sequences. The base station device receives a signal from the mobile station device using a physical uplink channel, the signal being generated from the encoded ACK/NACK sequences.

(8) In the wireless communication system according to the present invention, the mobile station device interleaves the plurality of ACKs/NACKs and a scheduling request together.

(9) A wireless communication system according to the present invention is a wireless communication system in which a mobile station device and a base station device perform, using a single physical channel, communication of ACKs or NACKs corresponding to individual transport blocks received in one or a plurality of subframes in a plurality of cells. The base station device sets a transmission mode for at least one of the plurality of cells, the transmission mode enabling two transport blocks to be transmitted in one subframe using spatial multiplexing. The mobile station device determines, in accordance with the number of bits of the ACKs or NACKs, whether or not to execute spatial bundling on ACKs or NACKs for the cell in the transmission mode. In case of receiving one transport block in the cell in the transmission mode in a certain subframe, if having determined not to execute spatial bundling on the ACKs or NACKs, the mobile station device generates an ACK or a NACK in response to the one received transport block and generates a NACK in response to a transport block which has not been received, and, if having determined to execute spatial bundling on the ACKs or NACKs, the mobile station device generates an ACK or a NACK in response to the one received transport block and not generating a NACK in response to a transport block which has not been received.

(10) A wireless communication method according to the present invention is a wireless communication method used for a mobile station device that communicates with a base station device using a plurality of cells which are set by the base station device. The wireless communication method includes: generating a plurality of ACK/NACK sequences by interleaving and dividing a plurality of ACKs/NACKs for a plurality of cells in a plurality of subframes; and separately encoding the plurality of ACK/NACK sequences.

(11) The wireless communication method according to the present invention includes executing a process of interleaving the plurality of ACKs/NACKs and a scheduling request together.

(12) A wireless communication method according to the present invention is a wireless communication method used for a mobile station device that communicates using a single physical channel, to a base station device, ACKs or NACKs corresponding to individual transport blocks received in one or a plurality of subframes in a plurality of cells. A transmission mode is set for at least one of the plurality of cells by the base station device, the transmission mode enabling two transport blocks to be transmitted in one subframe using spatial multiplexing. The wireless communication method includes: determining, in accordance with the number of bits of the ACKs or NACKs, whether or not to execute spatial bundling on ACKs or NACKs for the cell in the transmission mode; in case that one transport block is received in the cell in the transmission mode in a certain subframe, if it is determined that spatial bundling is not to be executed on the ACKs or NACKs, generating an ACK or a NACK in response to the one received transport block and generating a NACK in response to a transport block which has not been received; and if it is determined that spatial bundling is to be executed on the ACKs or NACKs, generating an ACK or a NACK in response to the one received transport block and not generating a NACK in response to a transport block which has not been received.

(13) A wireless communication method according to the present invention is a wireless communication method used for a base station device that communicates with a mobile station device using a plurality of set cells. The wireless communication method includes: receiving a signal which is generated from a plurality of encoded ACK/NACK sequences and which is transmitted on a physical uplink channel, the plurality of encoded ACK/NACK sequences being generated by interleaving and dividing a plurality of ACKs/NACKs for a plurality of cells in a plurality of subframes to generate a plurality of ACK/NACK sequences, and separately encoding the plurality of ACK/NACK sequences.

(14) In the wireless communication method according to the present invention, the plurality of ACK/NACK sequences are generated by interleaving the plurality of ACKs/NACKs and a scheduling request together.

(15) A wireless communication method according to the present invention is a wireless communication method used for a base station device that performs, with a mobile station device, using a single physical channel, communication of ACKs or NACKs corresponding to individual transport blocks transmitted in one or a plurality of subframes in a plurality of cells. The wireless communication method includes: setting a transmission mode for at least one of the plurality of cells, the transmission mode enabling two transport blocks to be transmitted in one subframe using spatial multiplexing; in case that the mobile station device receives one transport block in the cell in the transmission mode in a certain subframe, if it is determined that spatial bundling is not to be executed on the ACKs or NACKs by the mobile station device in accordance with the number of bits of the ACKs or NACKs, receiving, from the mobile station device, a signal generated from an ACK or a NACK generated by the mobile station device in response to the one transport block received by the mobile station device and a NACK generated by the mobile station device in response to a transport block which has not been received by the mobile station device; and if it is determined that spatial bundling is to be executed on the ACKs or NACKs by the mobile station device in accordance with the number of bits of the ACKs or NACKs, receiving, from the mobile station device, a signal generated from a result obtained by executing bundling on an ACK/NACK generated by the mobile station device in response to the one transmitted transport block and a signal other than a NACK corresponding to a transport block which has not been received.

(16) An integrated circuit according to the present invention is an integrated circuit used for a mobile station device that communicates with a base station device using a plurality of cells which are set by the base station device. The integrated circuit includes a function of generating a plurality of ACK/NACK sequences by interleaving and dividing a plurality of ACKs/NACKs for a plurality of cells in a plurality of subframes, and a function of separately encoding the plurality of ACK/NACK sequences.

(17) The integrated circuit according to the present invention includes a function of interleaving and separating the plurality of ACKs/NACKs and a scheduling request together.

(18) An integrated circuit according to the present invention is an integrated circuit used for a mobile station device that transmits on a single physical channel, to a base station device, ACKs or NACKs corresponding to individual transport blocks received in one or a plurality of subframes in a plurality of cells. A transmission mode is set for at least one of the plurality of cells by the base station device, the transmission mode enabling two transport blocks to be transmitted in one subframe using spatial multiplexing. The integrated circuit includes a function of determining, in accordance with the number of bits of the ACKs or NACKs, whether or not to execute spatial bundling on ACKs or NACKs for the cell in the transmission mode; a function of, if it is determined that spatial bundling is not to be executed on the ACKs or NACKs, generating an ACK or a NACK in response to the one received transport block and generating a NACK in response to a transport block which has not been received; and a function of, if it is determined that spatial bundling is to be executed on the ACKs or NACKs, generating an ACK or a NACK in response to the one received transport block and generating a signal other than a NACK in response to a transport block which has not been received.

(19) An integrated circuit according to the present invention is an integrated circuit used for a base station device that communicates with a mobile station device using a plurality of cells which are set for the mobile station device. The integrated circuit includes a function of receiving a signal which is generated from a plurality of encoded ACK/NACK sequences and which is transmitted on a physical uplink channel. The plurality of encoded ACK/NACK sequences are generated by, with the mobile station device, interleaving and dividing a plurality of ACKs/NACKs for a plurality of cells in a plurality of subframes to generate a plurality of ACK/NACK sequences, and separately encoding the plurality of ACK/NACK sequences.

(20) In the integrated circuit according to the present invention, the plurality of ACK/NACK sequences are generated by interleaving and separating the plurality of ACKs/NACKs and a scheduling request together.

(21) An integrated circuit according to the present invention is an integrated circuit used for a base station device that receives on a single physical channel, from a mobile station device, ACKs or NACKs corresponding to individual transport blocks transmitted in one or a plurality of subframes in a plurality of cells. The integrated circuit includes: a function of setting a transmission mode for at least one of the plurality of cells, the transmission mode enabling two transport blocks to be transmitted in one subframe using spatial multiplexing; in case that the mobile station device receives one transport block in the cell in the transmission mode in a certain subframe, a function of, if it is determined that spatial bundling is not to be executed on the ACKs or NACKs by the mobile station device in accordance with the number of bits of the ACKs or NACKs, receiving, from the mobile station device, a signal generated from an ACK or a NACK generated by the mobile station device in response to the one transport block received by the mobile station device and a NACK generated by the mobile station device in response to a transport block which has not been received by the mobile station device; and a function of, if it is determined that spatial bundling is to be executed on the ACKs or NACKs by the mobile station device in accordance with the number of bits of the ACKs or NACKs, receiving a signal generated from a result obtained by executing bundling on an ACK/NACK generated by the mobile station device in response to the one transmitted transport block and a signal other than a NACK corresponding to a transport block which has not been received.

Advantageous Effects of Invention

According to the present invention, a mobile station device is capable of executing processing on uplink control information by effectively using uplink resources when transmitting the uplink control information.

BRIEF DESCRIPTION OF DRAWINGS

FIG. 4 is a diagram describing a method for concatenating ACKs/NACKs according to the present invention.
FIG. 5 includes diagrams describing a method for interleaving uplink control information according to the present invention.
FIG. 12 is a table illustrating base sequences $M_{i,n}$ according to the present invention.

DESCRIPTION OF EMBODIMENTS

Hereinafter, an embodiment of the present invention will be described in detail with reference to the drawings. First, physical channels according to the present invention will be described.

Figure 1:
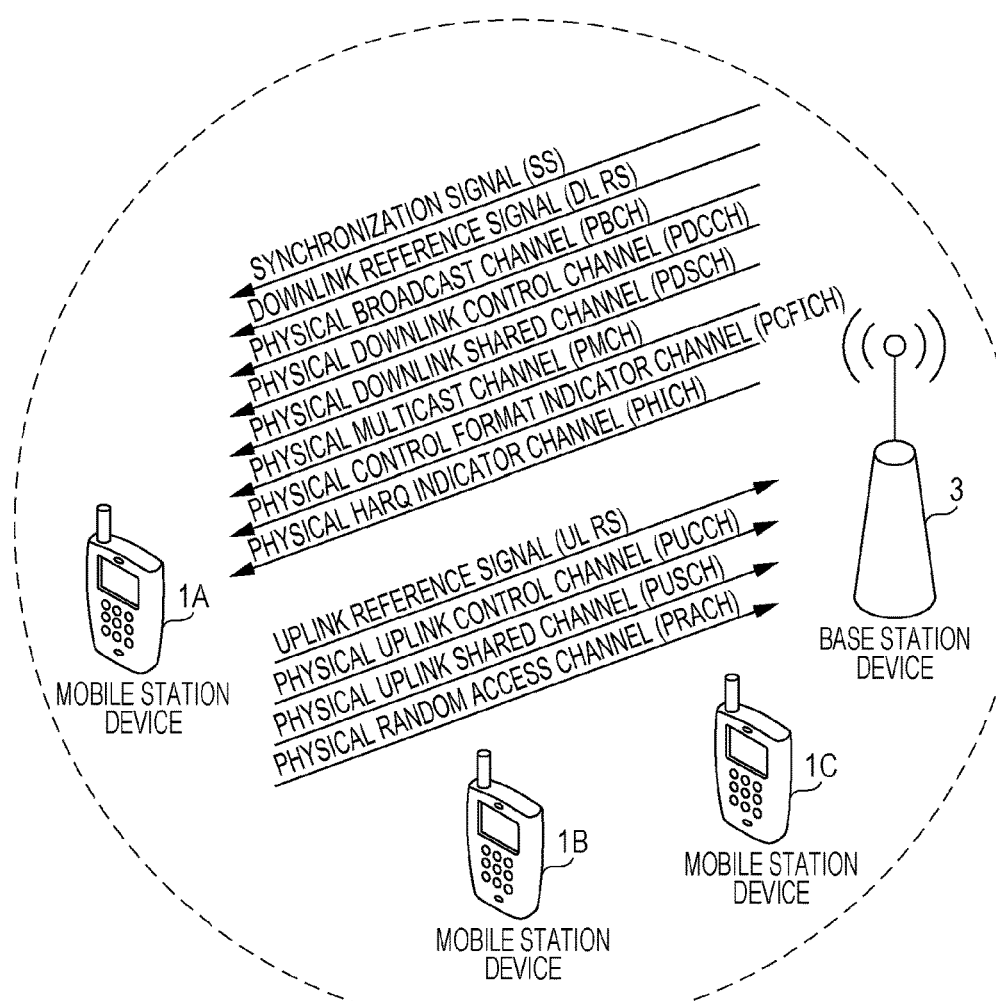
FIG. 1 is a conceptual diagram of a wireless communication system according to the present invention.

FIG. 1 is a conceptual diagram of a wireless communication system according to the present invention. In FIG. 1, the wireless communication system includes mobile station devices 1A to 1C and a base station device 3. FIG. 1 illustrates that a synchronization signal (SS), a downlink reference signal (DL RS), a Physical Broadcast Channel (PBCH), a Physical Downlink Control Channel (PDCCH), a Physical Downlink Shared Channel (PDSCH), a Physical Multicast Channel (PMCH), a Physical Control Format Indicator Channel (PCFICH), and a Physical Hybrid ARQ Indicator Channel (PHICH) are allocated for wireless communication from the base station device 3 to the mobile station devices 1A to 1C (downlink).

FIG. 1 illustrates that an uplink reference signal (UL RS), a Physical Uplink Control Channel (PUCCH), a Physical Uplink Shared Channel (PUSCH), and a Physical Random Access Channel (PRACH) are allocated for wireless communication from the mobile station devices 1A to 1C to the base station device 3 (uplink). Hereinafter, each of the mobile station devices 1A to 1C is referred to as a mobile station device 1.

The synchronization signal is a signal used by the mobile station device 1 to acquire synchronization in the frequency domain and time domain in downlink. The downlink reference signal is a signal used by the mobile station device 1 to acquire synchronization in the frequency domain and time domain in downlink, used by the mobile station device 1 to measure the reception quality of downlink, or used by the mobile station device 1 to perform channel compensation for PDSCH or PDCCH.

The PBCH is a physical channel used to broadcast control parameters (system information) (Broadcast Channel: BCH) used by the mobile station devices 1 in common. The PBCH is transmitted at intervals of 40 ms. The timings corresponding to the intervals of 40 ms are blindly detected in the mobile station devices 1.

The PDCCH is a physical channel used to transmit downlink control information (DCI), such as a downlink assignment (or also referred to as a downlink grant) and an uplink grant. The downlink assignment is constituted by information about the modulation scheme and coding rate (Modulation and Coding Scheme: MCS) on the PDSCH, that is, downlink data, information indicating the allocation of radio resources, and so forth. The uplink grant is constituted by information about the modulation scheme and coding rate on the PUSCH, that is, uplink data, information indicating the allocation of radio resources, and so forth.

A plurality of formats are used for the downlink control information. The formats of the downlink control information are referred to as DCI formats. As the DCI formats of a downlink assignment, there are provided DCI format 1A, which is used when the base station device 3 transmits one piece of downlink data on the PDSCH using one transmit antenna port or transmit diversity with a plurality of transmit antenna ports; DCI format 2, which is used when the base station device 3 transmits one or two pieces of downlink data (Downlink Shared Channel: DL-SCH) on a single PDSCH using MIMO SM (Multiple Input Multiple Output Spatial Multiplexing); and so forth.

As the DCI formats of an uplink grant, there are provided DCI format 0, which is used when the mobile station device 1 transmits the PUSCH using one transmit antenna port; DCI format 4, which is used when the mobile station device transmits one or two pieces of uplink data (Uplink Shared Channel: UL-SCH) on a single PUSCH using MIMO SM; and so forth.

The MIMO SM is a technology in which a plurality of signals are multiplexed to channels of a plurality of spatial dimensions realized by a plurality of transmit antenna ports and a plurality of receive antenna ports and are transmitted and received. Here, an antenna port is a logical antenna used for signal processing. One antenna port may be constituted by one physical antenna or a plurality of physical antennas.

On a transmitting side of MIMO SM, processing (referred to as precoding) for forming an appropriate spatial channel is performed on a plurality of signals, and the plurality of signals on which the precoding has been performed are transmitted using a plurality of transmit antennas. On a receiving side of MIMO SM, processing for appropriately separating a signal multiplexed by a channel of a spatial dimension is performed on a plurality of signals received using a plurality of receive antennas. Multiplexing a plurality of pieces of data to a single channel using MIMO SM is referred to as spatial domain multiplexing (SDM).

The base station device 3 sets the type of DCI format that the mobile station device 1 monitors for individual cells. For example, the base station device 3 is capable of making a setting so that the mobile station device 1 monitors DCI format 1A and DCI format 0 for cell 1 and monitors DCI format 1A and DCI format 2 for cell 2. The setting of the type of DCI format to be monitored by the mobile station device 1 for individual cells, performed by the base station device 3, is also referred to as setting of a transmission mode. The cell for which a setting has been made by the base station device 3 so that the mobile station device 1 monitors DCI format 1A as a downlink assignment for the cell is referred to as a non-SDM cell. The cell for which a setting has been made by the base station device 3 so that the mobile station device 1 monitors DCI format 1A and DCI format 2 as a downlink assignment for the cell is referred to as an SDM cell.

The base station device 3 transmits DCI format 4 which includes information indicating the number of pieces of uplink data to be transmitted on the PUSCH scheduled by the base station device 3, the number of regions (hereinafter referred to as layers) which are spatially multiplexed in the PUSCH, the layer in which the uplink data is mapped, and the type of precoding to be performed by the mobile station device 1. The mobile station device 1 determines the number of pieces of uplink data to be transmitted on the PUSCH corresponding to DCI format 4, the number of layers which are spatially multiplexed in the PUSCH, the layer in which the uplink data is mapped, and the type of precoding, on the basis of DCI format 4 received from the base station device 3.

The PDSCH is a physical channel used to transmit system information other than the BCH, which is not broadcasted on the PBCH, or downlink data, or Paging Channel (PCH). The PMCH is a physical channel used to transmit a Multicast Channel (MCH), which is information about MBMS (Multimedia Broadcast and Multicast Service). The PCFICH is a physical channel used to transmit information indicating the region in which the PDCCH is mapped.

The PHICH is a physical channel used to transmit an HARQ indicator, which indicates success or failure of decoding of the uplink data received by the base station device 3. If the base station device 3 has succeeded in decoding the uplink data included in the PUSCH, the HARQ indicator indicates ACK (ACKnowledgement). If the base station device 3 has failed in decoding the uplink data included in the PUSCH, the HARQ indicator indicates NACK (Negative ACKnowledgement). In the case of indicating success or failure of decoding for each of a plurality of pieces of uplink data included in the same PUSCH, a plurality of HARQ indicators are transmitted on a plurality of PHICHs.

The uplink reference signal is a signal used by the base station device 3 to acquire synchronization in the time domain in uplink, used by the base station device 3 to measure the reception quality of uplink, or used by the base station device 3 to perform channel compensation for PUSCH or PUCCH. The uplink reference signal is code spread using a CAZAC (Constant Amplitude and Zero Auto-Correlation) sequence in radio resources which are divided with the assumption of SC-FDMA.

The CAZAC sequence is a sequence having a constant amplitude and excellent autocorrelation characteristics in the time domain and the frequency domain. Because the amplitude is constant in the time domain, the PAPR (Peak to Average Power Ratio) can be suppressed to be low. A cyclic delay is applied to the DMRS in the time domain. The cyclic delay in the time domain is referred to as a cyclic shift.

The cyclic shift corresponds to phase rotation of a CAZAC sequence in the frequency domain in units of subcarriers.

Examples of the uplink reference signal include a DMRS (Demodulation Reference Signal) which is time-multiplexed with the PUSCH or PUCCH and transmitted and which is used for channel compensation for the PUSCH and PUCCH, and an SRS (Sounding Reference Signal) which is transmitted independently of the PUSCH and PUCCH and which is used by the base station device 3 to estimate the condition of the uplink channel. A spread code (Orthogonal Cover Code: OCC) in the time domain, as well as the cyclic shift, is used for the DMRS.

The PUCCH is a physical channel used to transmit uplink control information (UCI), which is information used for controlling communication, such as channel quality information indicating the quality of downlink channels, a scheduling request (SR) indicating a request for allocating uplink radio resources, and an ACK/NACK (also referred to as HARQ-ACK) indicating success or failure of decoding of downlink data received by the mobile station device 1.

Examples of the channel quality information include a channel quality indicator (CQI), a rank indicator (RI), and a precoding matrix indicator (PMI). The CQI is information indicating channel quality, and is used for changing radio transmission parameters, such as an error correction scheme of physical channels in downlink, a coding rate of error correction, and a data modulation order. The RI is information indicating the number (rank) of units (streams) of signal sequences in which transmit signal sequences are preprocessed in advance, for which the mobile station device 1 makes a request to the base station device 3 in a case where a plurality of pieces of downlink data are spatially multiplexed and transmitted using the MIMO SM scheme in downlink. The PMI is information about precoding for preprocessing transmit signal sequences in advance, for which the mobile station device 1 makes a request to the base station device 3 in the case of performing spatial multiplexing and transmission using the MIMO SM scheme.

The PUSCH is a physical channel used to transmit uplink data or uplink control information. In a case where the mobile station device is not allocated radio resources for the PUSCH when transmitting uplink control information, the uplink control information is transmitted on the PUCCH. In a case where the mobile station device is allocated radio resources for the PUSCH when transmitting uplink control information, the uplink control information is transmitted on the PUSCH. In a case where radio resources for a plurality of PUSCHs are allocated, the uplink control information is transmitted on any one of the PUSCHs.

The PRACH is a physical channel used to transmit a random access preamble. The biggest purpose of the PRACH is to allow the mobile station device 1 to acquire synchronization with the base station device 3 in the time domain. Also, the PRACH is used for initial access, handover, reconnection request, and request for allocating uplink radio resources.

The uplink data (UL-SCH), downlink data (DL-SCH), multicast channel (MCH), PCH, BCH, and so forth are transport channels. The unit of transmitting uplink data on the PUSCH and the unit of transmitting downlink data on the PDSCH are referred to as a transport block. The transport block is a unit which is handled in the MAC (Media Access Control) layer, and HARQ (retransmission) control is performed in units of transport blocks.

In the physical layer, a transport block is associated with a cord word (CW), and signal processing such as encoding is performed in units of code words. The size of a transport block corresponds to the number of bits of the transport block (payload size). The mobile station device 1 identifies the size of a transport block from the number of physical resource blocks (PRBs) indicated by information indicating the allocation of radio resources for the PUSCH or PDSCH, and information about the modulation scheme and coding rate (MCS or MCS&RV (Redundancy Version)) of the PUSCH or PDSCH, which are included in an uplink grant or downlink assignment.

Figure 2:
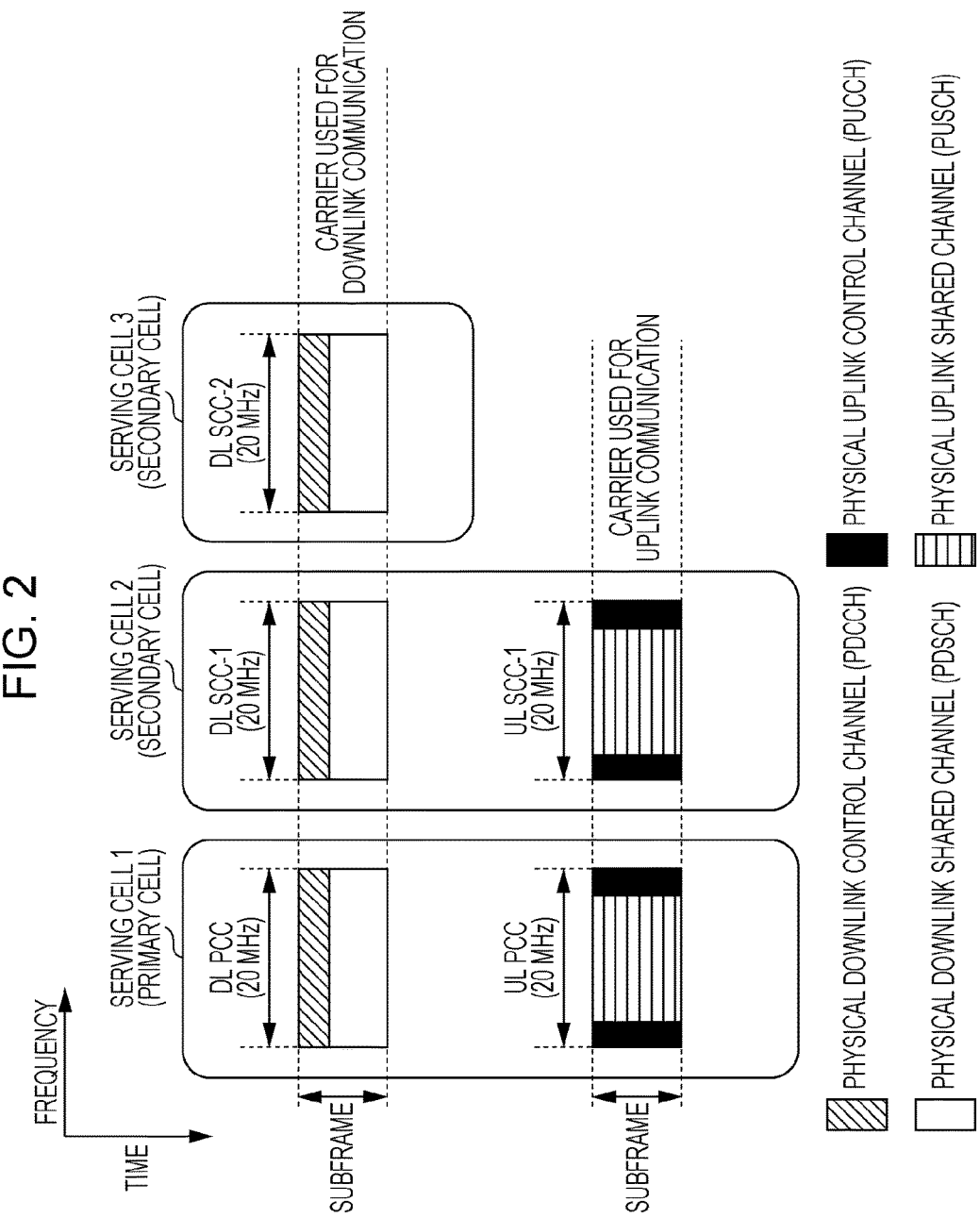
FIG. 2 is a diagram illustrating an example of cell aggregation processing according to the present invention.

Hereinafter, cell aggregation (carrier aggregation) according to the present invention will be described. FIG. 2 is a diagram illustrating an example of cell aggregation processing according to the present invention. In FIG. 2, the horizontal axis represents the frequency domain and the vertical axis represents the time domain. In the cell aggregation processing illustrated in FIG. 2, three serving cells (serving cell 1, serving cell 2, and serving cell 3) are aggregated. One of the plurality of aggregated serving cells is a primary cell (P-cell). The primary cell is a serving cell having functions equivalent to those of a cell in LTE.

The serving cells other than the primary cell are secondary cells (S-cells). The secondary cells have functions which are more limited than the primary cell, and are mainly used to transmit and receive the PDSCH and/or PUSCH. For example, the mobile station device 1 performs random access using only the primary cell. Also, the mobile station device 1 may not necessarily receive paging and system information transmitted on the PBCH and PDSCH of the secondary cells.

The carriers corresponding to serving cells in the downlink are downlink component carriers (DL CCs), and the carriers corresponding to serving cells in the uplink are uplink component carriers (UL CCs). The carrier corresponding to the primary cell in the downlink is a downlink primary component carrier (DL PCC), and the carrier corresponding to the primary cell in the uplink is an uplink primary component carrier (UL PCC). The carriers corresponding to the secondary cells in the downlink are downlink secondary component carriers (DL SCCs), and the carriers corresponding to the secondary cells in the uplink are uplink secondary component carriers (UL SCCs).

The base station device 3 necessarily sets both the DL PCC and the UL PCC as a primary cell. Also, the base station device 3 is capable of setting only the DL SCC or both the DL SCC and the UL SCC as a secondary cell. Further, the frequency or carrier frequency of a serving cell is called a serving frequency or serving carrier frequency, the frequency or carrier frequency of a primary cell is called a primary frequency or primary carrier frequency, and the frequency or carrier frequency of a secondary cell is called a secondary frequency or secondary carrier frequency.

The mobile station device 1 and the base station device 3 first start communication using one serving cell. After communication has started, the base station device 3 sets a set of one primary cell and one or a plurality of secondary cells for the mobile station device 1 by using an RRC signal (radio resource control signal). The base station device 3 is capable of setting a cell index for a secondary cell. The cell index of the primary cell is constantly zero. The cell index of the same cell may be different among the mobile station devices 1. The base station device 3 is capable of instructing the mobile station device 1 to change the primary cell using handover.

In FIG. 2, the serving cell 1 is the primary cell, and the serving cell 2 and the serving cell 3 are the secondary cells. Both the DL PCC and UL PCC are set in the serving cell 1 (primary cell), both the DL SCC-1 and UL SCC-2 are set in the serving cell 2 (secondary cell), and only the DL SCC-2 is set in the serving cell 3 (secondary cell).

The channels used in the DL CCs and UL CCs have the same channel structure as that in LTE. In FIG. 2, each of the DL CCs has a region to which the PHICH, the PCFICH, and the PDCCH are mapped, which is represented by a region hatched with oblique lines, and a region to which the PDSCH is mapped, which is represented by a region hatched with dots. The PHICH, the PCFICH, and the PDCCH are frequency-multiplexed and/or time-multiplexed. The region where the PHICH, the PCFICH, and the PDCCH are frequency-multiplexed and/or time-multiplexed and the region to which the PDSCH is mapped are time-multiplexed. In each of the UL CCs, the region to which the PUCCH represented by a gray region is mapped, and the region to which the PUSCH represented by a region hatched with horizontal lines is mapped are frequency-multiplexed.

In cell aggregation, up to one PDSCH can be transmitted using one serving cell (DL CC), and up to one PUSCH can be transmitted using one serving cell (UL CC). In FIG. 2, up to three PDSCHs can be simultaneously transmitted using three DL CCs, and up to two PUSCHs can be simultaneously transmitted using two UL CCs.

Furthermore, in cell aggregation, a downlink assignment including information indicating the allocation of radio resources for the PDSCH in the primary cell, and an uplink grant including information indicating the allocation of radio resources for the PUSCH in the primary cell, are transmitted on the PDCCHs of the primary cell. One serving cell in which a downlink assignment including information indicating the allocation of radio resources for the PDSCH in the secondary cell and an uplink grant including information indicating the allocation of radio resources for the PUSCH in the secondary cell are transmitted on the PDCCH is set by the base station device 3. This setting may vary among the mobile station devices 1.

If a setting is made so that a downlink assignment including information indicating the allocation of radio resources for the PDSCH and an uplink grant including information indicating the allocation of radio resources for the PUSCH in a certain secondary cell are to be transmitted using a different serving cell, the mobile station device 1 does not decode the PDCCH in this secondary cell. For example, in FIG. 2, if a setting is made so that a downlink assignment including information indicating the allocation of radio resources for the PDSCH and an uplink grant including information indicating the allocation of radio resources for the PUSCH in the serving cell 2 are to be transmitted using the serving cell 1, and that a downlink assignment including information indicating the allocation of radio resources for the PDSCH and an uplink grant including information indicating the allocation of radio resources for the PUSCH in the serving cell 3 are to be transmitted using the serving cell 3, the mobile station device 1 decodes the PDCCH in the serving cell 1 and the serving cell 3, and does not decode the PDCCH in the serving cell 2.

The base station device 3 sets, for each serving cell, whether or not a downlink assignment and an uplink grant include a carrier indicator, which is information indicating the serving cell to which the downlink assignment and the uplink grant allocate the radio resources for the PDSCH or PUSCH. The PHICH is transmitted in the serving cell in which the uplink grant including the information indicating the allocation of radio resources for the PUSCH for which the PHICH indicates an ACK/NACK has been transmitted.

The base station device 3 is capable of deactivating and activating the secondary cell which has been set for the mobile station device 1 using MAC (Medium Access Control) CE (Control Element). The mobile station device 1 does not receive any physical channels and signals of downlink and does not transmit any physical channels and signals of uplink in a deactivated cell, and does not monitor downlink control information for the deactivated cell. The mobile station device 1 regards a secondary cell which is newly added by the base station device 3 as a deactivated cell. Note that the primary cell is not deactivated.

In an FDD (Frequency Division Duplex) wireless communication system, a DL CC and a UL CC corresponding to a single serving cell are constructed at different frequencies. In a TDD (Time Division Duplex) wireless communication system, a DL CC and a UL CC corresponding to a single serving cell are constructed at the same frequency, and an uplink subframe and a downlink subframe are time-multiplexed at a serving frequency.

Figure 3:
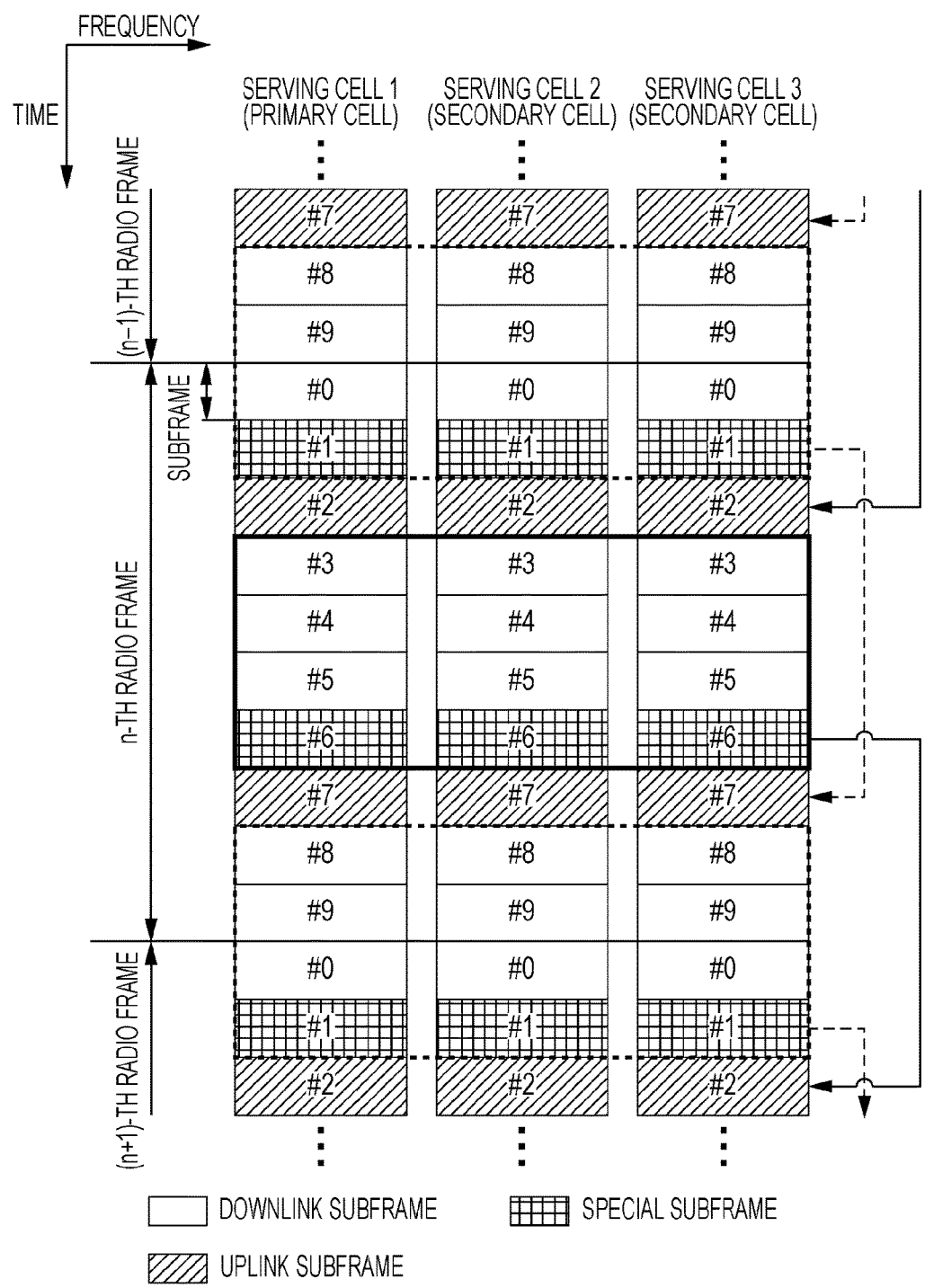
FIG. 3 is a diagram illustrating an example of the configuration of radio frames in a TDD wireless communication system according to the present invention.

FIG. 3 is a diagram illustrating an example of the configuration of radio frames in a TDD wireless communication system according to the present invention. In FIG. 3, the horizontal axis represents the frequency domain and the vertical axis represents the time domain. In FIG. 3, white rectangles represent downlink subframes, rectangles hatched with oblique lines represent downlink subframes, and rectangles hatched with dots represent special subframes. The number (#i) assigned to each subframe is the number of the subframe in the radio frames.

In the downlink subframes, physical channels, such as the PDCCH and PDSCH, and signals of downlink are transmitted. In the uplink subframes, physical channels, such as the PUCCH and PUSCH, and signals of uplink are transmitted. Each special subframe includes three fields, DwPTS (Downlink Pilot Time Slot), GP (Guard Period), and UpPTS (Uplink Pilot Time Slot). The DwPTS, the GP, and the UpPTS are time-multiplexed. The DwPTS is a field in which physical channels, such as the PDCCH and PDSCH, and signals of downlink are transmitted. The UpPTS is a field in which SRS and/or PRACH is transmitted. In the UpPTS, the PUCCH and PUSCH are not transmitted. The GP is a period in which the mobile station device 1 and the base station device 3 switch between uplink transmission/reception and downlink transmission/reception.

All the serving cells that are aggregated have the same subframe pattern. That is, at a certain timing, the mobile station device 1 and the base station device 3 perform wireless communication using subframes of the same type in all the serving cells that are aggregated. In FIG. 3, a plurality of ACKs/NACKs for downlink data received by the mobile station device 1 on the PDSCHs of the subframes #8, the subframes #9, the subframes #0, and the subframes #1 in the serving cell 1 to the serving cell 3 (the subframes surrounded by a thick broken line in FIG. 3) are transmitted on the PUCCHs or PUSCHs of the subframes #7, which are six subframes after the subframes #1. Also, a plurality of ACKs/NACKs for downlink data received by the mobile station device 1 on the PDSCHs of the subframes #3 to the subframes #6 in the serving cell 1 to the serving cell 3 (the subframes surrounded by the thick solid line in FIG. 3) are transmitted on the PUCCHs or PUSCHs in the subframes #2, which are six subframes after the subframes #6.

The mobile station device 1 does not generate an ACK/NACK in the case of not having received any PDSCH in a certain subframe or a certain subframe group (a group of subframes surrounded by the thick broken line or the thick solid line in FIG. 3). In a case where a setting has been made by the base station device 3 so as to monitor DCI format 1A as a downlink assignment for a certain cell, the mobile station device 1 receives up to one piece of downlink data on a single PDSCH in this cell.

Furthermore, the mobile station device 1 generates one ACK/NACK for one piece of downlink data received on a single PDSCH in this cell. At this time, the mobile station device 1 receives at least one PDSCH in a certain subframe or a certain subframe group. In the case of not having received a PDSCH in a cell for which a setting has been made by the base station device 3 to monitor DCI format 1A in a certain subframe, the mobile station device 1 generates one NACK for this cell in the certain subframe.

Also, in a case where a setting has been made by the base station device 3 so as to monitor DCI format 1A and DCI format 2 as a downlink assignment for a certain cell, the mobile station device 1 receives up to two pieces of downlink data on a single PDSCH in this cell. Furthermore, the mobile station device 1 generates two ACKs/NACKs for one or two pieces of downlink data received on the single PDSCH in this cell. At this time, in the case of having received two pieces of downlink data on the single PDSCH, the mobile station device 1 generates two ACKs/NACKs for the two received pieces of downlink data.

In the case of having received one piece of downlink data on the single PDSCH, the mobile station device 1 generates one ACK/NACK for the one received piece of downlink data and one NACK. Furthermore, in the case of having received at least one PDSCH in a certain subframe or a certain subframe group and not having received any PDSCH in the cell for which a setting has been made by the base station device 3 so as to monitor DCI format 1A and DCI format 2 in a certain cell, the mobile station device 1 generates two NACKs for this cell in the certain subframe.

That is, if the mobile station device 1 which is set by the base station device 3 so as to monitor DCI format 1A and DCI format 2 as a downlink assignment for a certain cell receives one piece of downlink data on a single PDSCH, the mobile station device 1 generates one ACK/NACK for the one received piece of downlink data and one NACK. At this time, however, if the mobile station device 1 executes spatial bundling on the ACK/NACK for the PDSCH, one NACK is generated in all cases, and the NACK is transmitted to the base station device 3 even if the mobile station device 1 has succeeded in receiving downlink data. That is, the mobile station device 1 is incapable of transmitting a correct ACK/NACK to the base station device 3. As a result, a problem arises in which uplink resources cannot be effectively used.

Accordingly, if the mobile station device 1 that is set by the base station device 3 so as to monitor DCI format 1A and DCI format 2 as a downlink assignment for a certain cell and that executes spatial bundling on ACKs/NACKs for two pieces of downlink data received on a single PDSCH in this cell receives one piece of downlink data on a single PDSCH, the mobile station device 1 is capable of generating one ACK/NACK for the one received piece of downlink data.

That is, if the mobile station device 1 that is set by the base station device 3 so as to monitor DCI format 1A and DCI format 2 as a downlink assignment for a certain cell receives two pieces of downlink data on a single PDSCH when executing spatial bundling on ACKs/NACKs for this cell, the mobile station device 1 is capable of executing spatial bundling on two ACKs/NACKs for the respective received pieces of downlink data. Also, if the mobile station device 1 that is set by the base station device 3 so as to monitor DCI format 1A and DCI format 2 as a downlink assignment for a certain cell receives one piece of downlink data on a single PDSCH of this cell, the mobile station device 1 generates one ACK/NACK only for the one received piece of downlink data.

Here, the mobile station device 1 is set by the base station device 3 so that, in the case of having received two pieces of downlink data on a single PDSCH of this cell, the mobile station device 1 executes spatial bundling on two ACKs/NACKs for the respective received pieces of downlink data. As will be described below, the mobile station device 1 may determine whether or not to execute spatial bundling on ACKs/NACKs in accordance with the number of bits (payload size) of the ACKs/NACKs. That is, the mobile station device 1 executes spatial bundling on ACKs/NACKs for the two pieces of downlink data received on the single PDSCH.

Furthermore, if the mobile station device 1 that is set by the base station device 3 so as to monitor DCI format 1A and DCI format 2 as a downlink assignment for a certain cell receives one piece of downlink data on a single PDSCH of this cell, the mobile station device 1 generates one ACK/NACK for the one received piece of downlink data and one NACK for the downlink data which has not been received. Here, the mobile station device 1 is set by the base station device 3 so that, in the case of having received two pieces of downlink data on a single PDSCH of this cell, the mobile station device 1 does not execute spatial bundling on two ACKs/NACKs for the respective received pieces of downlink data. As will be described below, the mobile station device 1 may determine whether or not to execute spatial bundling on ACKs/NACKs in accordance with the number of bits (payload size) of the ACKs/NACKs. That is, the mobile station device 1 does not execute spatial bundling on ACKs/NACKs for one or two pieces of downlink data received on the single PDSCH.

Accordingly, the problem, in which if the mobile station device 1 that is set by the base station device 3 so as to monitor DCI format 1A and DCI format 2 as a downlink assignment for a certain cell receives one piece of downlink data on a single PDSCH, the mobile station device 1 generates one ACK/NACK for the one received piece of downlink data and one NACK, and also executes spatial bundling on ACKs/NACKs for this PDSCH, thereby generating one NACK in all cases, can be avoided. As a result, uplink resources can be effectively used.

In a case where a secondary cell is deactivated, the mobile station device 1 generates NACKs as all ACKs/NACKs for the deactivated secondary cell.

Hereinafter, the method for encoding ACKs/NACKs according to the present invention will be described. The mobile station device 1 divides ACKs/NACKs transmitted on the same PUCCH or the same PUSCH into a first ACK/NACK segment (high-order bits of ACK/NACK) and a second ACK/NACK segment (low-order bits of ACK/NACK), and separately executes Reed-Muller coding on the first ACK/NACK segment and the second ACK/NACK segment obtained through division. The mobile station device 1 modulates the encoded bits of the first ACK/NACK segment and the encoded bits of the second ACK/NACK segment, and transmits them using different uplink radio resources.

The base station device 3 receives a signal of the first ACK/NACK segment and a signal of the second ACK/NACK segment, and separately decodes the first ACK/NACK segment and the second ACK/NACK segment. The base station device 3 knows that the mobile station device 1 has generated a NACK as an ACK/NACK for a deactivated cell or an ACK/NACK for a cell of a subframe in which the base station device 3 has not transmitted the PDSCH to the mobile station device 1, and thus does not need to detect an ACK/NACK.

Hereinafter, the method for concatenating ACKs/NACKs according to the present invention will be described. For example, in FIG. 3, the mobile station device 1 which is set so as to monitor only DCI format 1A for the serving cell 1 and the serving cell 2, which is set so as to monitor DCI format 1A and DCI format 2 for the serving cell 3, and for which the serving cell 3 is deactivated, generates four ACKs/NACKs for the serving cell 1, four ACKs/NACKs for the serving cell 2, and eight NACKs for the serving cell 1, as the ACKs/NACKs for a subframe group.

At this time, if the mobile station device 1 concatenates the four ACKs/NACKs for the serving cell 1, the four ACKs/NACKs for the serving cell 2, and the eight NACKs for the serving cell 3 in order, the first ACK/NACK segment is constituted by the four ACKs/NACKs for the serving cell 1 and the four ACKs/NACKs for the serving cell 2, and the second ACK/NACK segment is constituted by the eight NACKs for the serving cell 3.

However, the base station device 3 knows that the ACKs/NACKs for the deactivated serving cell 3 are all NACKs, and does not need to receive the second ACK/NACK segment. Thus, the mobile station device 1 transmits an unnecessary signal, causing a problem in which uplink resources cannot be effectively used. Further, if NACKs for the deactivated serving cell are unevenly included in one of the ACK/NACK segments, the number of ACKs/NACKs detected by the base station device 3 becomes uneven, the qualities of the ACK/NACK segments become uneven, and as a result, a problem occurs in which uplink resources cannot be effectively used.

Accordingly, the mobile station device 1 concatenates ACKs/NACKs for a plurality of serving cells in a plurality of subframes in a subframe group, in order from the ACKs/NACKs for a plurality of serving cells in the first subframe in the subframe group. After concatenating all the ACKs/NACKs for the plurality of serving cells in a certain subframe, the mobile station device 1 concatenates the ACKs/NACKs for the plurality of serving cells in the next subframe. The ACKs/NACKs for the plurality of serving cells in the same subframe are concatenated in the order of cell indexes of the serving cells to which the ACKs/NACKs correspond.

FIG. 4 is a diagram describing the method for concatenating ACKs/NACKs according to the present invention. In FIG. 4, the horizontal axis represents the frequency domain and the vertical axis represents the time domain. In FIG. 4, the mobile station device 1 concatenates the ACKs/NACKs corresponding to the serving cell 1 to the serving cell 3 in the first subframe in the subframe group in order. The mobile station device 1 repeats the process of concatenating all the ACKs/NACKs for the serving cell 1 to the serving cell 3 in the first subframe and then concatenating all the ACKs/NACKs for the serving cell 1 to the serving cell 3 in the second subframe.

Accordingly, the problem in which ACKs/NACKs for the deactivated serving cell are unevenly included in one of the ACK/NACK segments, and the qualities of the ACK/NACK segments become uneven, and the problem in which the mobile station device 1 transmits an unnecessary signal, can be avoided. As a result, uplink resources can be effectively used.

In addition, there is a possibility that the base station device 3 stops downlink data communication in units of subframes in order to prevent signal interference between the cell of the own device and an adjacent cell (the cell managed by another base station device 3). In such a case, the ACKs/NACKs for the plurality of serving cells in the same subframe are unevenly included in one of the ACK/NACK segments, thereby causing a problem in which the qualities of the ACK/NACK segments become uneven. For this reason, after concatenating the ACKs/NACKs in the manner illustrated in FIG. 4, the mobile station device 1 may further interleave the concatenated ACKs/NACKs.

When transmitting an ACK/NACK and channel quality information on the PUSCH, the mobile station device 1 separately encodes the ACK/NACK and the channel quality information. When transmitting an ACK/NACK, channel quality information, and an SR on the PUSCH, the mobile station device 1 encodes the ACK/NACK, the channel quality information, and the SR together. When transmitting an ACK/NACK, channel quality information, and an SR on the same PUCCH, the mobile station device 1 may concatenate the ACK/NACK, the channel quality information, and the SR, and then interleave the ACK/NACK, the channel quality information, and the SR together.

FIG. 5 includes diagrams describing the method for interleaving uplink control information according to the present invention. In FIG. 5, two serving cells, a serving cell 1 and a serving cell 2, are set for the mobile station device 1. The mobile station device 1 is set so as to monitor DCI format 1A and DCI format 2 for the serving cell 1, and is set so as to monitor DCI format 1A for the serving cell 2. Also, the mobile station device 1 transmits an ACK/NACK, channel quality information, and an SR on the same PUCCH.

In FIG. 5, A/N (i, j) represents the ACK/NACK for the serving cell 1 and the serving cell 2 in the i-th subframe. "j" is 1 for the ACK/NACK for the first downlink data in the serving cell 1, is 2 for the ACK/NACK for the second downlink data in the serving cell 1, and is 3 for the ACK/NACK for the first downlink data in the serving cell 2. In FIG. 5, CQI (k) represents the k-th information bit of channel quality information, and SR represents the bit indicating a scheduling request.

The mobile station device 1 arranges the ACKs/NACKs, channel quality information, and SR in the manner illustrated in FIG. 5 (a), and then cyclically shifts the ACKs/NACKs in the second column by one in an incremental manner, and cyclically shifts the ACKs/NACKs in the third column by two in an incremental manner, as illustrated in FIG. 5 (b). The mobile station device 1 reads out information bits row by row from the right side of the top row in FIG. 5 (b), and thereby different types of uplink control information are distributed into different ACK/NACK segments. Also, the ACKs/NACKs for the plurality of serving cells in the same subframe are distributed into different ACK/NACK segments. Also, the ACKs/NACKs for the same serving cell are distributed into different ACK/NACK segments. Accordingly, the problem in which the qualities of the ACK/NACK segments become uneven and the problem in which the mobile station device 1 transmits an unnecessary signal can be avoided, and as a result, uplink resources can be effectively used.

Hereinafter, the method for determining whether or not to execute spatial bundling on ACKs/NACKs according to the present invention will be described.

The base sequence $M_{i,n}$ of Reed-Muller codes used for encoding ACK/NACK segments according to the present invention supports up to 11 bits. Thus, with the use of two ACK/NACK segments, uplink control information of 22 bits can be encoded. To simultaneously transmit ACKs/NACKs and SR, the maximum payload size of the ACKs/NACKs is set to be 21 bits. If the payload size (the number of bits) of the ACKs/NACKs is larger than 11 bits and smaller than 22 bits, bundling is not executed on the ACKs/NACKs. If the payload size of the ACKs/NACKs is equal to or larger than 22 bits, bundling is executed on the ACKs/NACKs.

For example, in a case where all serving cells are SDM cells and the payload size of ACKs/NACKs is 24 bits, if the mobile station device 1 executes spatial bundling on all the ACKs/NACKs, the payload size of the ACKs/NACKs becomes 12 bits. Accordingly, though the mobile station device 1 is capable of simultaneously transmitting ACKs/NACKs of 21 bits using uplink resources, the mobile station device 1 transmits bundled ACKs/NACKs of 12 bits, and thus uplink resources cannot be effectively used. In addition, a NACK is generated as a result of bundling ACKs, causing a problem of frequent occurrence of an event in which the base station device 3 retransmits downlink data though the mobile station device 1 has succeeded in decoding downlink data.

Accordingly, in a case where the payload size of ACKs/NACKs for a plurality of cells in a plurality of subframes in a subframe group is equal to or larger than 22 bits, the mobile station device 1 first executes spatial bundling on the ACKs/NACKs in units of cells, and tries to set the payload size of the ACKs/NACKs to be the closest to 22 bits and smaller than 22 bits. That is, the mobile station device 1 executes a process of spatially bundling the ACKs/NACKs for the cells in order until the payload size of the ACKs/NACKs becomes a certain size (21 bits) or less.

The mobile station device 1 executes a process of spatially bundling ACKs/NACKs for a secondary cell, in order from the secondary cell among a plurality of cells (primary cell and secondary cell). In a case where a plurality of secondary cells are set by the base station device 3, the mobile station device 1 selects a secondary cell in accordance with the priority for the secondary cells notified from the base station device 3 or the order of cell indexes set by the mobile station device 3, and executes a process of spatially bundling the ACKs/NACKs for the selected cell.

Figure 6:
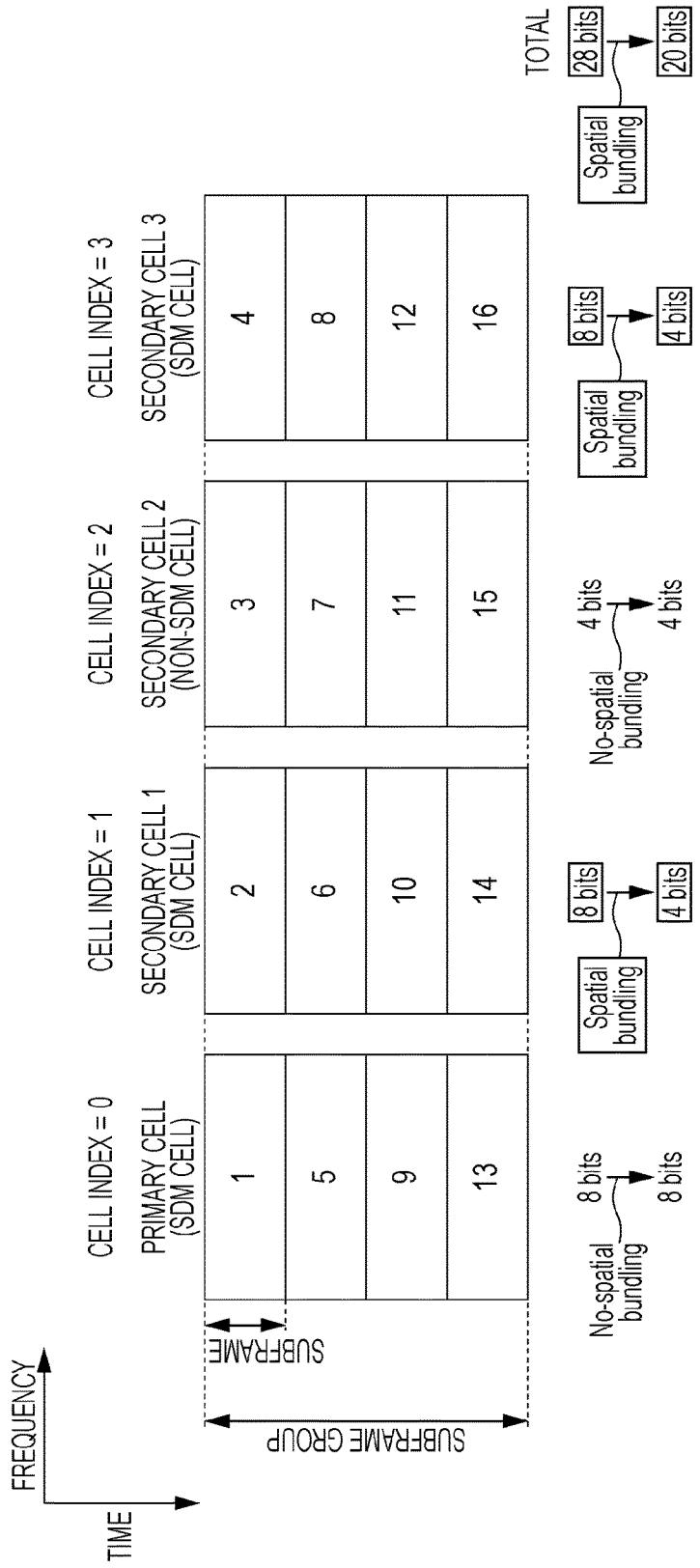
FIG. 6 is a diagram illustrating an example of executing spatial bundling on ACKs/NACKs according to the present invention.

FIG. 6 is a diagram illustrating an example of executing spatial bundling on ACKs/NACKs according to the present invention. In FIG. 6, the horizontal axis represents the frequency domain and the vertical axis represents the time domain. In FIG. 6, one primary cell and three secondary cells are set for the base station device 1.

The cell index of the primary cell is 0, the cell index of the secondary cell 1 is 1, the cell index of the secondary cell 2 is 2, and the cell index of the secondary cell 3 is 3. The primary cell, the secondary cell 2, and the secondary cell 3 are SDM cells, and the secondary cell 2 is a non-SDM cell. In FIG. 6, a subframe group in which ACKs/NACKs corresponding to downlink subframes are transmitted together on the physical channel of the same uplink subframe by the mobile station device 1 is constituted by four subframes.

In FIG. 6, the mobile station device 1 first generates ACKs/NACKs for a plurality of serving cells in a plurality of subframes in the subframe group. The mobile station device 1 generates ACKs/NACKs of 8 bits in total for an SDM cell, 2 bits for each subframe, and generates ACKs/NACKs of 4 bits in total for a non-SDM cell, 1 bit for each subframe. In FIG. 6, the mobile station device 1 generates ACKs/NACKs of 28 bits for the subframe group.

Subsequently, since the payload size of the generated ACKs/NACKs is larger than the certain size (21 bits), the mobile station device 1 executes spatial bundling on the ACKs/NACKs of 8 bits for the secondary cell 3, which is the SDM cell having the largest cell index, thereby generating ACKs/NACKs of 4 bits for the secondary cell 3. Accordingly, the payload size of the ACKs/NACKs for the subframe group becomes 24 bits, which is still larger than the certain size (21 bits). Thus, the mobile station device 1 executes spatial bundling on the ACKs/NACKs of 8 bits for the secondary cell 1, which is the SDM cell having the second largest cell index, thereby generating ACKs/NACKs of 4 bits for the secondary cell 1. Accordingly, the payload size of the ACKs/NACKs for the subframe group becomes 20 bits, which is smaller than the certain size (21 bits), and thus the mobile station device 1 ends spatial bundling for the ACKs/NACKs.

If the payload size of the ACKs/NACKs is equal to or larger than 22 bits even after spatial bundling has been executed on the ACKs/NACKs for all the serving cells, or if all the serving cells are non-SDM cells and if the payload size of the ACKs/NACKs is equal to or larger than 22 bits, the mobile station device 1 executes time-domain bundling on the ACKs/NACKs in units of cells, and tries to set the payload size of the ACKs/NACKs to be the closest to 22 bits and smaller than 22 bits. That is, the mobile station device 1 executes a process of executing time-domain bundling on the ACKs/NACKs for the cells in order until the payload size of the ACKs/NACKs becomes equal to or smaller than the certain size (21 bits).

After executing spatial bundling on the ACKs/NACKs in FIG. 6, the mobile station device 1 concatenates the ACKs/NACKs in the order of the numerals written in the rectangles. In a case where spatial bundling has not been executed on the ACKs/NACKs, the ACKs/NACKs are concatenated in order from the first downlink data which is spatial-domain multiplexed.

Next, the method for determining whether or not to execute time-domain bundling on ACKs/NACKs according to the present invention will be described.

In a case where the payload size of ACKs/NACKs for a plurality of cells in a plurality of subframes in a subframe group is equal to or larger than 22 bits, the mobile station device 1 executes time-domain bundling on the ACKs/NACKs in units of cells, and tries to set the payload size of the ACKs/NACKs to be the closest to and smaller than 22 bits. That is, the mobile station device 1 executes time-domain bundling on the ACKs/NACKs for the cells in order until the payload size of the ACKs/NACKs becomes equal to or smaller than the certain size (21 bits).

The mobile station device 1 executes a process of time-domain bundling on ACKs/NACKs for a secondary cell, in order from the secondary cell among a plurality of cells (primary cell and secondary cell). In a case where a plurality of secondary cells are set by the base station device 3, the mobile station device 1 selects a secondary cell in accordance with the priority for the secondary cells notified from the base station device 3 or the order of cell indexes set by the mobile station device 3, and executes a process of time-domain bundling on the ACKs/NACKs for the selected cell.

Figure 7:
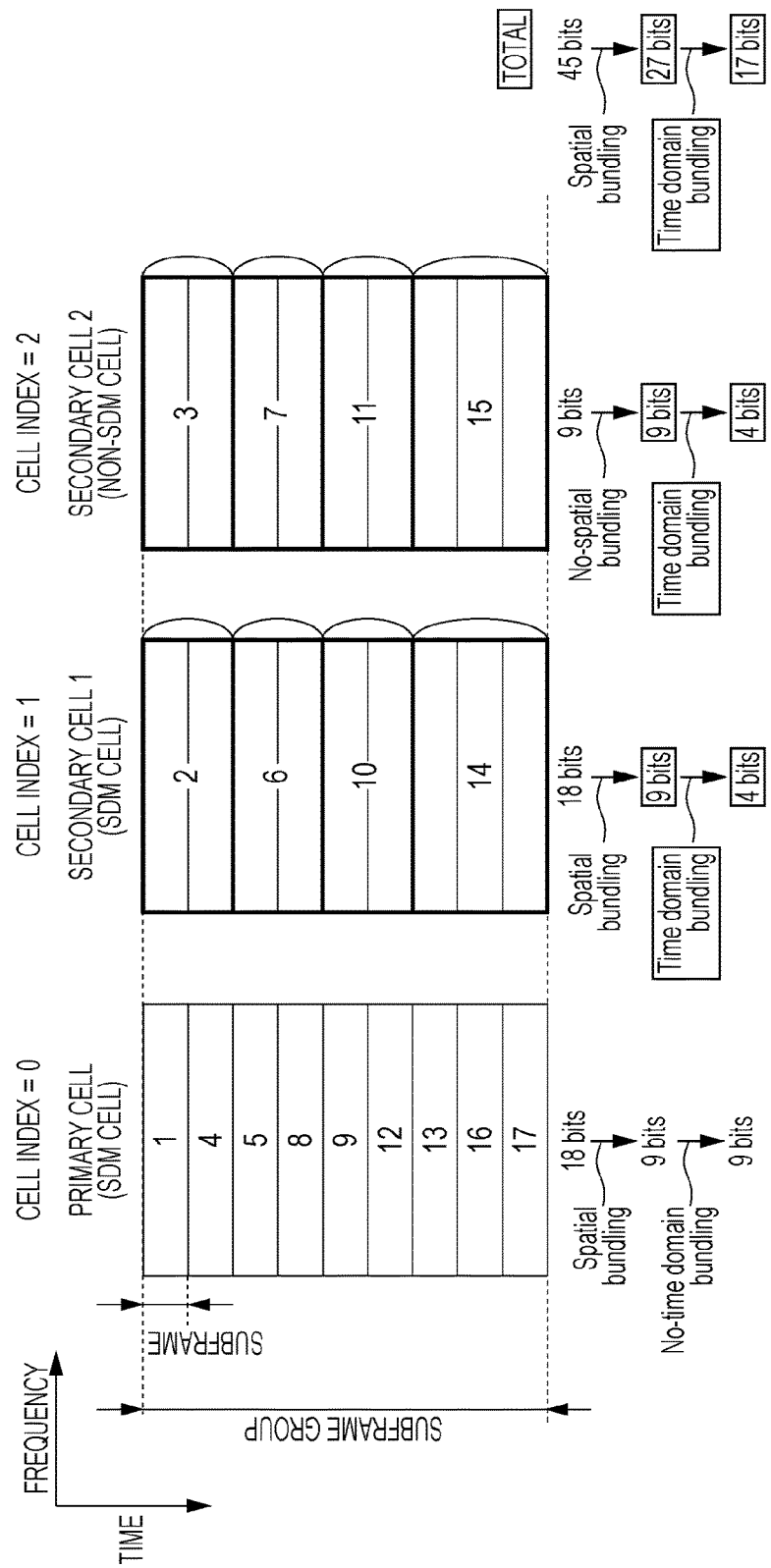
FIG. 7 is a diagram illustrating an example of executing time-domain bundling on ACKs/NACKs according to the present invention.

FIG. 7 is a diagram illustrating an example of executing time-domain bundling on ACKs/NACKs according to the present invention. In FIG. 7, the horizontal axis represents the frequency domain and the vertical axis represents the time domain. In FIG. 7, one primary cell and two secondary cells are set for the mobile station device 1. The cell index of the primary cell is 0, the cell index of the secondary cell 1 is 1, and the cell index of the secondary cell 2 is 2. The primary cell and the secondary cell 2 are SDM cells, and the secondary cell 2 is a non-SDM cell. In FIG. 7, a subframe group in which ACKs/NACKs corresponding to downlink subframes are transmitted together on the physical channel of the same uplink subframe by the mobile station device 1 is constituted by four subframes.

In FIG. 7, the mobile station device 1 first generates ACKs/NACKs for a plurality of serving cells in a plurality of subframes in the subframe group. The mobile station device 1 generates ACKs/NACKs of 18 bits in total for an SDM cell, 2 bits for each subframe, and generates ACKs/NACKs of 9 bits in total for a non-SDM cell, 1 bit for each subframe. In FIG. 7, the mobile station device 1 generates ACKs/NACKs of 45 bits for the subframe group.

Subsequently, since the payload size of the generated ACKs/NACKs is larger than the certain size (21 bits), the mobile station device 1 executes spatial bundling on the ACKs/NACKs of 18 bits for each of the primary cell and the secondary cell 1, thereby generating ACKs/NACKs of 9 bits for each of the primary cell and the secondary cell 1.

Accordingly, the payload size of the ACKs/NACKs for the subframe group becomes 27 bits, which is still larger than the certain size (21 bits). Thus, the mobile station device 1 executes time-domain bundling on the ACKs/NACKs of 9 bits for the secondary cell 2, which is the serving cell having the largest cell index, thereby generating ACKs/NACKs of 4 bits for the secondary cell 2.

Accordingly, the payload size of the ACKs/NACKs for the subframe group becomes 22 bits, which is still larger than the certain size (21 bits). Thus, the mobile station device 1 executes time-domain bundling on the ACKs/NACKs of 9 bits for the secondary cell 1, which is the serving cell having the second largest cell index, thereby generating ACKs/NACKs of 4 bits for the secondary cell 1. Accordingly, the payload size of the ACKs/NACKs for the subframe group becomes 17 bits, which is smaller than the certain size (21 bits), and thus the mobile station device 1 ends time-domain bundling for the ACKs/NACKs.

In FIG. 7, when the mobile station device 1 executes time-domain bundling on the cells, the mobile station device 1 executes time-domain bundling on the first and second subframes, the third and fourth subframes, the fifth and sixth subframes, and the seventh, eighth, and ninth subframes in the subframe group, thereby generating bundled ACKs/NACKs of 4 bits in units of cells. Because four bundled ACKs/NACKs are generated in units of cells, the mobile station device 1 is capable of transmitting bundled ACKs/NACKs of 20 bits for five cells to the base station device 3 using the physical channel of the same uplink subframe.

After executing spatial bundling and/or time-domain bundling on the ACKs/NACKs in FIG. 7, the mobile station device 1 concatenates the ACKs/NACKs for a certain cell and a certain subframe or a plurality of subframes on which time-domain bundling has been executed, in the order of the numerals written in the rectangles.

Accordingly, the mobile station device 1 is capable of transmitting ACKs/NACKs of a payload size which is equal to or smaller than the maximum payload size of ACKs/NACKs that can be transmitted on physical channels and which is approximate to the maximum payload size, without executing an excessive bundling process on ACKs/NACKs of a payload size larger than a certain size, and uplink resources can be effectively used.

Figure 8:
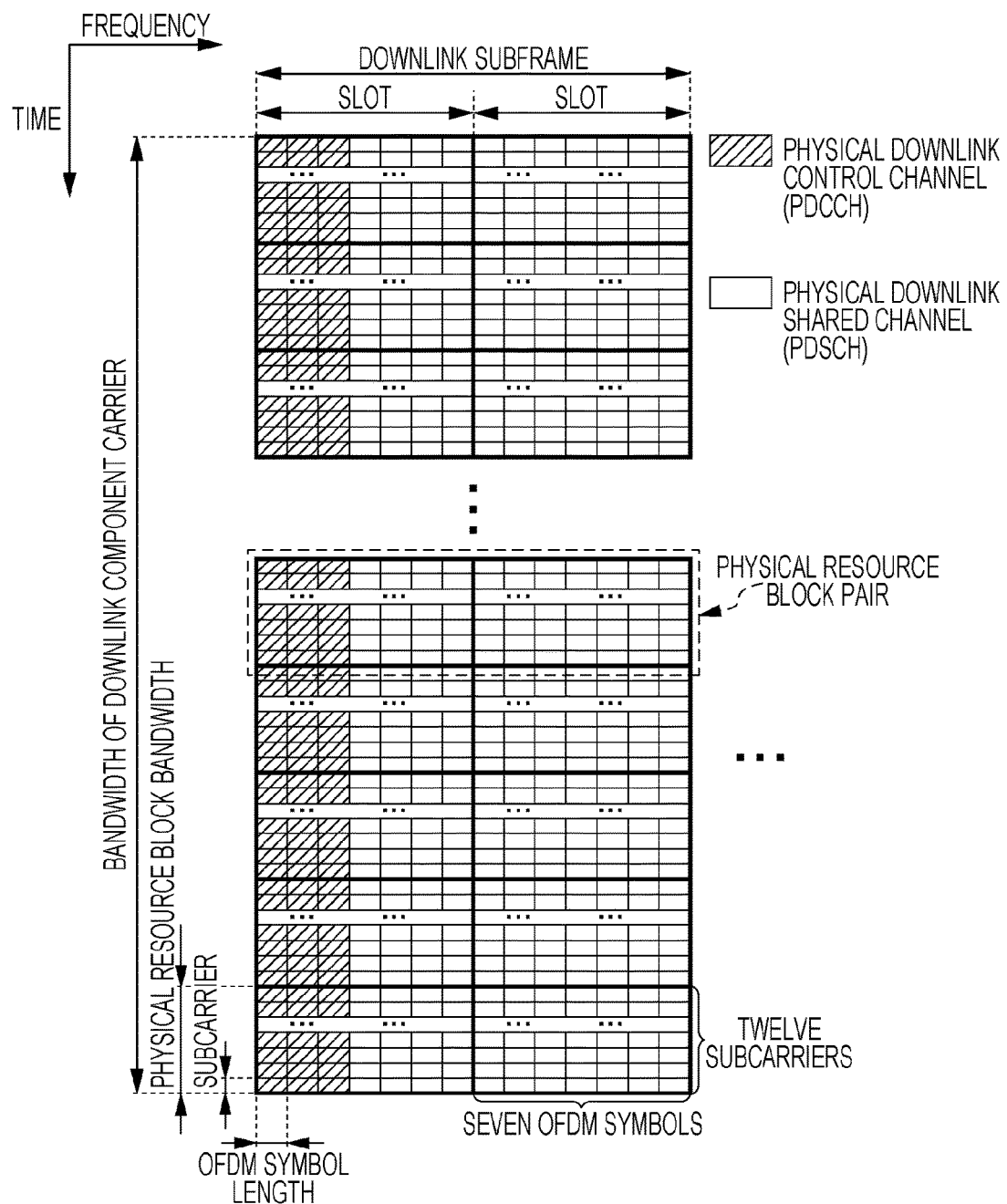
FIG. 8 is a schematic diagram illustrating an example of the configuration of a downlink subframe according to the present invention.

Hereinafter, the configuration of a subframe according to the present invention will be described. FIG. 8 is a schematic diagram illustrating an example of the configuration of a downlink subframe according to the present invention. In FIG. 8, the horizontal axis represents the time domain and the vertical axis represents the frequency domain. As illustrated in FIG. 8, a downlink subframe is constituted by a plurality of downlink physical resource block (PRB) pairs (for example, the region surrounded by the broken line in FIG. 8). Each of the downlink physical resource block pairs is the unit of allocation of radio resources, for example, and is composed of a frequency band of a predetermined width (PRB bandwidth; 180 kHz) and a time zone (two slots=one subframe; 1 ms).

One downlink physical resource block pair is constituted by two downlink physical resource blocks (PRB bandwidth× slot) which are contiguous in the time domain. One downlink physical resource block (the unit surrounded by a thick line in FIG. 8) is constituted by twelve subcarriers (15 kHz) in the frequency domain, and is constituted by seven OFDM (Orthogonal Frequency Division Multiplexing) symbols (71 μs) in the time domain.

In the time domain, one subframe (1 ms) is constituted by two slots (0.5 ms). One slot is constituted by seven OFDM symbols (about 71 μs). A time interval of 1 ms, which corresponds to a subframe, is also referred to as a transmit time interval (TTI). In the frequency domain, a plurality of downlink physical resource blocks are mapped in accordance with the bandwidth of a DL CC. The unit constituted by one subcarrier and one OFDM symbol is referred to as a downlink resource element.

Hereinafter, mapping of physical channels allocated in downlink will be described. The PDCCH, the PCFICH, the PHICH, the PDSCH, the downlink reference signal, and so forth are mapped to each downlink subframe. The PDCCH is mapped from the OFDM symbol at the top of the subframe (the region hatched with upward-sloping lines in FIG. 8). The number of OFDM symbols to which the PDCCH is mapped varies among subframes, and information indicating the number of OFDM symbols to which the PDCCH is mapped is broadcasted on the PCFICH transmitted in the first OFDM symbol in the subframe. In each subframe, a plurality of PDCCHs are frequency-multiplexed and time-multiplexed.

The PCFICH is mapped to the OFDM symbol at the top of the subframe, and is frequency-multiplexed with the PDCCH. The PHICH is frequency-multiplexed in the same OFDM symbol as the PDCCH. In each subframe, a plurality of PHICHs are frequency-multiplexed and code-multiplexed. The mobile station device 1 receives an ACK/NACK on the PHICH in a downlink subframe after a certain period of time has elapsed since a PUSCH was transmitted (for example, after 4 ms, after four subframes, or after 4 TTI), for uplink data transmitted on the PUSCH.

The PDSCH is mapped to the OFDM symbols (the non-hatched region in FIG. 8) other than the OFDM symbols to which the PDCCH, the PCFICH, and the PHICH are mapped in the subframe. The allocation of radio resources for the PDSCH is indicated to the mobile station device 1 using a downlink assignment. The radio resources for the PDSCH are mapped to the same downlink subframe as that for the PDCCH which includes the downlink assignment indicating the allocation of the PDSCH in the time domain.

The PDSCH and the PDCCH corresponding to the PDSCH are mapped to the same serving cell or different serving cells. In a subframe of each downlink component carrier, a plurality of PDSCHs are frequency-multiplexed and space-multiplexed. Although the illustration is omitted in FIG. 8 for simple description, downlink reference signals are mapped in a distributing manner in the frequency domain and the time domain.

Figure 9:
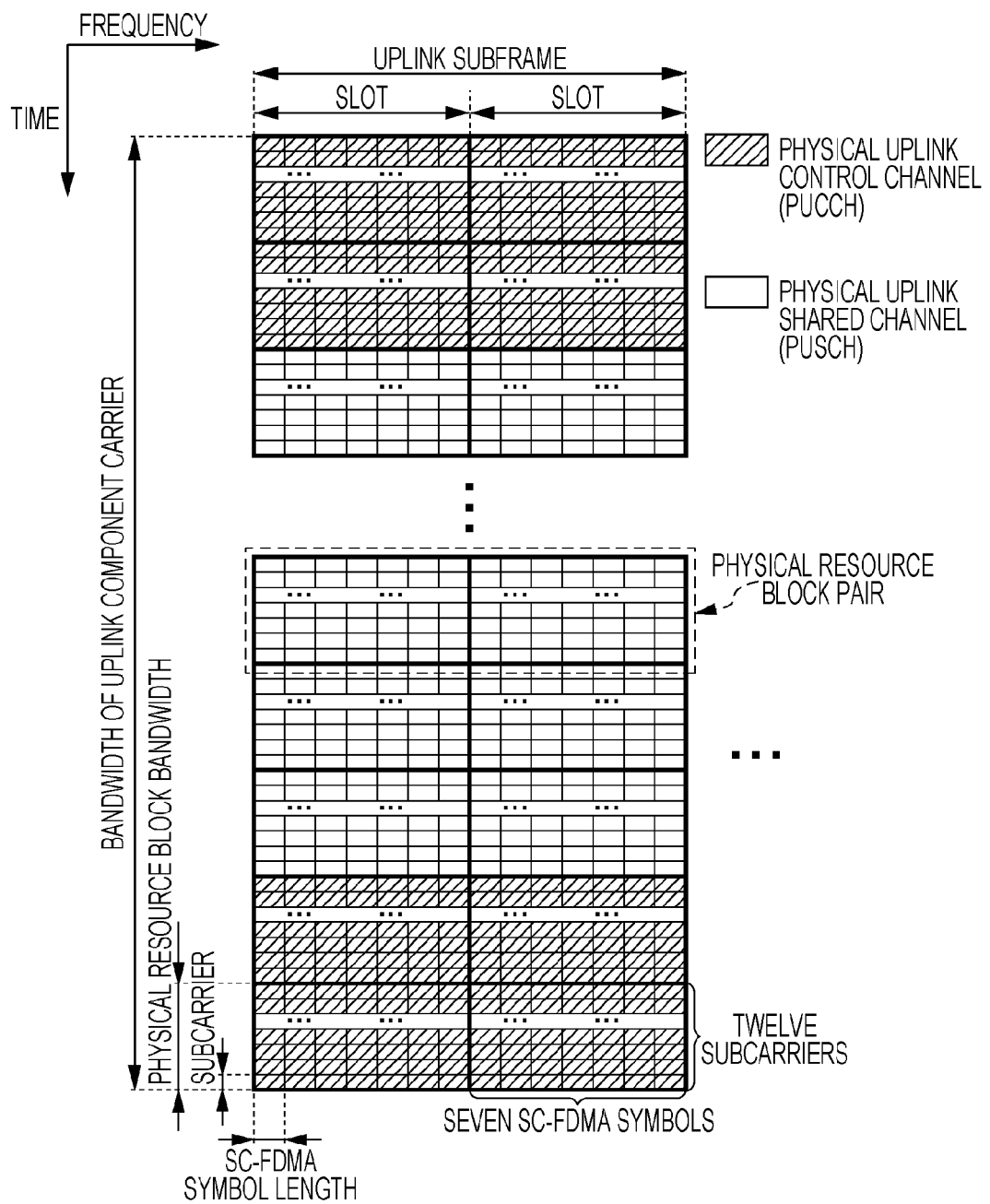
FIG. 9 is a schematic diagram illustrating an example of the configuration of an uplink subframe according to the present invention.

FIG. 9 is a schematic diagram illustrating an example of the configuration of an uplink subframe according to the present invention. In FIG. 9, the horizontal axis represents the frequency domain and the vertical axis represents the time domain. As illustrated in FIG. 9, a subframe of a UL CC is constituted by a plurality of uplink physical resource block pairs (for example, the region surrounded by the broken line in FIG. 9). Each of the uplink physical resource block pairs is the unit of allocation of radio resources, for example, and is composed of a frequency band of a predetermined width (PRB bandwidth; 180 kHz) and a time zone (two slots=one subframe; 1 ms).

One uplink physical resource block pair is constituted by two uplink physical resource blocks (PRB bandwidth×slot) which are contiguous in the time domain. One uplink physical resource block (the unit surrounded by a thick line in FIG. 9) is constituted by twelve subcarriers in the frequency domain, and is constituted by seven SC-FDMA (Single-Carrier Frequency Division Multiple Access) symbols (71 μs) in the time domain.

In the time domain, one subframe (1 ms) is constituted by two slots (0.5 ms). One slot is constituted by seven SC-FDMA symbols (time symbols) (about 71 μs). A time interval of 1 ms, which corresponds to a subframe, is also referred to as a transmit time interval (TTI). In the frequency domain, a plurality of uplink physical resource blocks are mapped in accordance with the bandwidth of a UL CC. The unit constituted by one subcarrier and one SC-FDMA symbol is referred to as an uplink resource element.

Hereinafter, physical channels allocated in uplink radio frames will be described. The PUCCH, the PUSCH, the PRACH, the uplink reference signal, and so forth are mapped to each uplink subframe. The PUCCH is mapped to uplink physical resource blocks at both ends of the band of the uplink (the regions hatched with upward-sloping lines). In each subframe, a plurality of PUCCHs are frequency-multiplexed and code-multiplexed.

The PUSCH is mapped to the uplink physical resource block pairs (the non-hatched region) other than the uplink physical resource blocks to which the PUCCH is mapped. The radio resources for the PUSCH are allocated using an uplink grant, and are mapped to uplink subframes after a certain period of time has elapsed from the downlink subframe to which the PDCCH including the uplink grant (for example, after 4 ms, after four subframes, or after 4 TTI). In each subframe, a plurality of PUSCHs are frequency-multiplexed and space-multiplexed.

Information indicating the subframes and uplink physical resource blocks on which the PRACH is mapped is broadcasted by the base station device 3. The uplink reference signal is time-multiplexed with the PUSCH and PUCCH and is transmitted. In a case where the PUSCH and the uplink reference signal are time-multiplexed, the uplink reference signal is mapped to the same frequency band as that to which the PUSCH is allocated in the frequency domain, and is mapped to the fourth and eleventh SC-FDMA symbols in the time domain. In a case where the PUCCH and the uplink reference signal are time-multiplexed, the uplink reference signal is mapped to the same frequency band as that to which the PUCCH is allocated in the frequency domain, and is mapped to the second, fifth, ninth, and thirteenth SC-FDMA symbols in the time domain.

Figure 10:
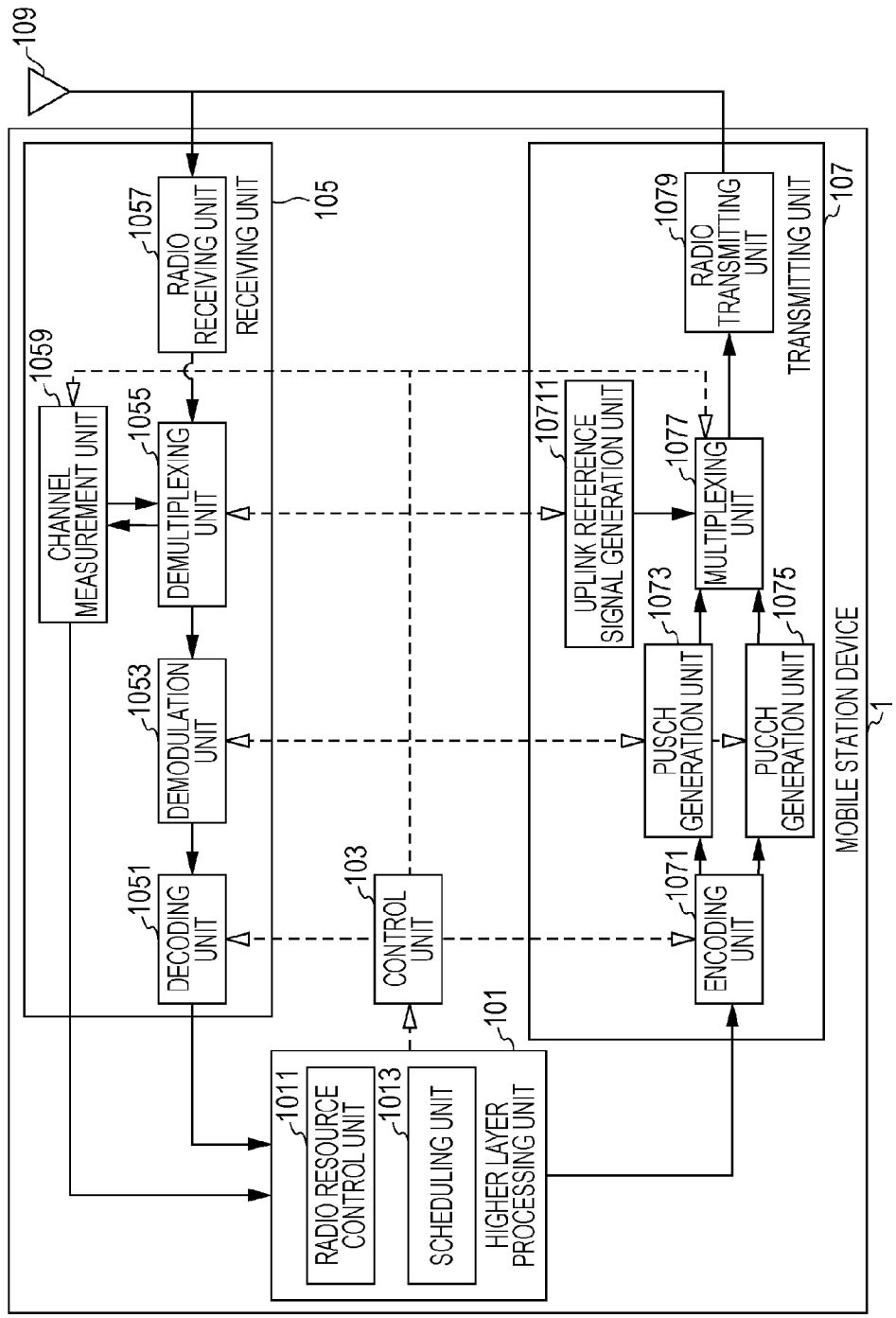
FIG. 10 is a schematic block diagram illustrating the configuration of each of mobile station devices 1 according to the present invention.

Hereinafter, the device configuration of each of the mobile station devices 1 according to the present invention will be described. FIG. 10 is a schematic block diagram illustrating the configuration of each of the mobile station devices 1 according to the present invention. As illustrated in the figure, the mobile station device 1 includes a higher layer processing unit 101, a control unit 103, a receiving unit 105, a transmitting unit 107, and a transmit/receive antenna 109. The higher layer processing unit 101 includes a radio resource control unit 1011 and a scheduling unit 1013. The receiving unit 105 includes a decoding unit 1051, a demodulation unit 1053, a demultiplexing unit 1055, a radio receiving unit 1057, and a channel measurement unit 1059. The transmitting unit 107 includes an encoding unit 1071, a PUSCH generation unit 1073, a PUCCH generation unit 1075, a multiplexing unit 1077, a radio transmitting unit 1079, and an uplink reference signal generation unit 10711.

The higher layer processing unit 101 outputs uplink data generated through a user operation or the like to the transmitting unit 107. Also, the higher layer processing unit 101 performs processing of a medium access control (MAC) layer, a packet data convergence protocol (PDCP) layer, a radio link control (RLC) layer, and a radio resource control (RRC) layer. Further, the higher layer processing unit 101 generates control information to control the receiving unit 105 and the transmitting unit 107, on the basis of downlink control information and so forth received on the PDCCH, and outputs the control information to the control unit 103.

The radio resource control unit 1011 included in the higher layer processing unit 101 manages various pieces of setting information about the own device. For example, the radio resource control unit 1011 manages set serving cells. Also, the radio resource control unit 1011 generates information to be mapped to each uplink channel, and outputs the information to the transmitting unit 107. If the received uplink data has been successfully decoded, the radio resource control unit 1011 generates an ACK and outputs the ACK to the transmitting unit 107. If the received uplink data has not been successfully decoded, the radio resource control unit 1011 generates a NACK and outputs the NACK to the transmitting unit 107.

The scheduling unit 1013 included in the higher layer processing unit 101 stores downlink control information received via the receiving unit 105. The scheduling unit 1013 controls the transmitting unit 107 via the control unit 103 to transmit a PUSCH in accordance with the received uplink grant, in the subframe which is four subframes after the subframe in which the uplink grant has been received. The scheduling unit 1013 controls the transmitting unit 107 via the control unit 103 to retransmit a PUSCH in accordance with the uplink grant stored in the scheduling unit 1013, in the subframe which is four subframes after the subframe in which an HARQ indicator indicating a NACK has been received. The scheduling unit 1013 controls the receiving unit 105 via the control unit 103 to receive a PDSCH in accordance with the received downlink assignment, in the subframe in which the downlink assignment has been received.

The control unit 103 generates a control signal for controlling the receiving unit 105 and the transmitting unit 107, on the basis of the control information from the higher layer processing unit 101. The control unit 103 outputs the generated control signal to the receiving unit 105 and the transmitting unit 107, and controls the receiving unit 105 and the transmitting unit 107.

The receiving unit 105 demultiplexes, demodulates, and decodes a reception signal received from the base station device 3 via the transmit/receive antenna 109 in accordance with the control signal input from the control unit 103, and outputs the decoded information to the higher layer processing unit 101.

The radio receiving unit 1057 converts (down coverts) a downlink signal received via the transmit/receive antenna 109 into an intermediate-frequency signal, removes unnecessary frequency components, controls the amplification level so that the signal level is appropriately maintained, orthogonally demodulates the received signal on the basis of the in-phase component and quadrature component of the received signal, and converts the orthogonally demodulated analog signal into a digital signal. The radio receiving unit 1057 removes a portion corresponding to a guard interval (GI) from the converted digital signal, performs fast Fourier transform (FFT) on the signal from which the guard interval has been removed, and extracts a signal in the frequency domain.

The demultiplexing unit 1055 demultiplexes the extracted signal into the PHICH, the PDCCH, the PDSCH, and the downlink reference signal. The demultiplexing is performed on the basis of radio resource allocation information or the like notified through a downlink assignment. Also, the demultiplexing unit 1055 performs channel compensation for the PHICH, the PDCCH, and the PDSCH using the estimated values of the channels input from the channel measurement unit 1059. Further, the demultiplexing unit 1055 outputs the downlink reference signal obtained through demultiplexing to the channel measurement unit 1059.

The demodulation unit 1053 multiplies the PHICH by the corresponding code to combine them, demodulates the composite signal using the BPSK (Binary Phase Shift Keying) modulation scheme, and outputs the result to the decoding unit 1051. The decoding unit 1051 decodes the PHICH addressed to the own device, and outputs the HARQ indicator obtained through decoding to the higher layer processing unit 101. The demodulation unit 1053 demodulates the PDCCH using the QPSK (Quadrature Phase Shift Keying) modulation scheme, and outputs the result to the decoding unit 1051. The decoding unit 1051 tries to blindly decode the PDCCH, and, in the case of having succeeded in the blind decoding, outputs the decoded downlink control information and RNTI included in the downlink control information to the higher layer processing unit 101. The demodulation unit 1053 demodulates the PDSCH using the modulation scheme notified through a downlink assignment, such as QPSK, 16QAM (Quadrature Amplitude Modulation), or 64QAM, and outputs the result to the decoding unit 1051.

The decoding unit 1051 performs decoding on the basis of information about the coding rate notified through the downlink control information, and outputs the decoded downlink data to the higher layer processing unit 101. The channel measurement unit 1059 measures the downlink path loss and the channel state from the downlink reference signal input from the demultiplexing unit 1055, and outputs the measured path loss and channel state to the higher layer processing unit 101. Also, the channel measurement unit 1059 calculates the estimated values of the downlink channels from the downlink reference signal, and outputs the estimated values to the demultiplexing unit 1055.

The transmitting unit 107 generates an uplink reference signal in accordance with the control signal input from the control unit 103, encodes and modulates the uplink data and uplink control information input from the higher layer processing unit 101, multiplexes the PUCCH, the PUSCH, and the generated uplink reference signal, and transmits the result to the base station device 3 via the transmit/receive antenna 109.

Figure 11:
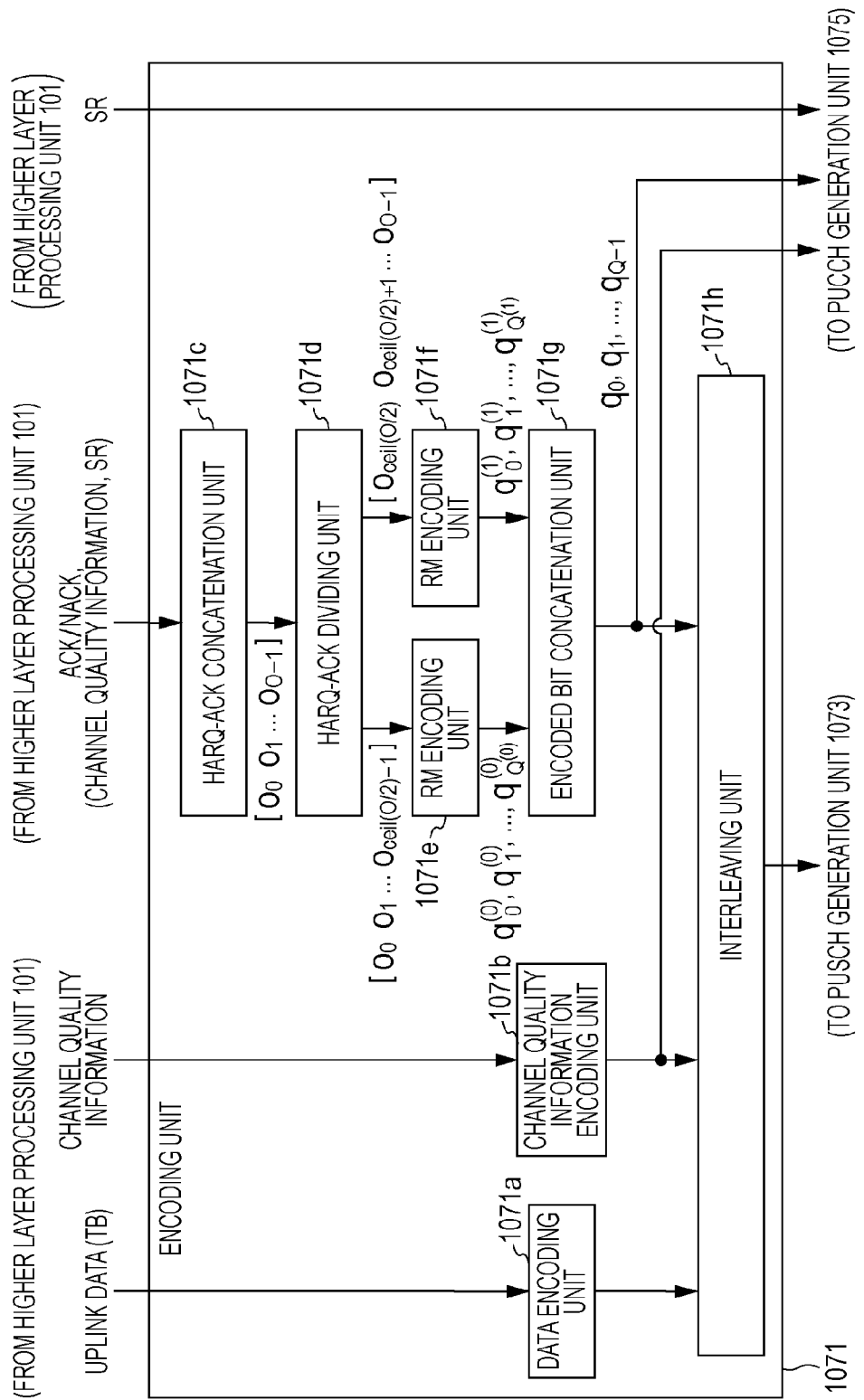
FIG. 11 is a schematic block diagram illustrating the configuration of an encoding unit 1071 according to the present invention.

The encoding unit 1071 encodes the uplink control information and uplink data input from the higher layer processing unit 101, and outputs the encoded bits to the PUSCH generation unit and/or the PUCCH generation unit. FIG. 11 is a schematic block diagram illustrating the configuration of the encoding unit 1071 according to the present invention. The encoding unit 1071 includes a data encoding unit 1071a, a channel quality information encoding unit 1071b, an HARQ-ACK concatenation unit 1071c, an HARQ-ACK dividing unit 1071d, an RM encoding unit 1071e, an RM encoding unit 1071f, an encoded bit concatenation unit 1071g, and an interleaving unit 1071h.

The data encoding unit 1071a encodes the uplink data input from the higher layer processing unit 101 on the basis of the uplink grant received from the base station device 3, and outputs the encoded bits of the uplink data to the interleaving unit 1071h.

When channel quality information is to be transmitted on the PUCCH of the same uplink subframe, or channel quality information is to be transmitted on the PUSCH, channel quality information is input to the channel quality information encoding unit 1071b from the higher layer processing unit 101, and the channel quality information encoding unit 1071b encodes the channel quality information input from the higher layer processing unit 101. When channel quality information is to be transmitted on the PUSCH, the channel quality information encoding unit 1071b outputs the encoded bits of the channel quality information to the interleaving unit 1071h. When only channel quality information is to be transmitted on the PUCCH, the channel quality information encoding unit 1071b outputs the encoded bits of the channel quality information to the PUCCH generation unit 1075.

When ACKs/NACKs, channel quality information, and SR are to be transmitted on the PUCCH of the same uplink subframe, the ACKs/NACKs, channel quality information, and SR are input to the HARQ-ACK concatenation unit 1071c from the higher layer processing unit 101, and the HARQ-ACK concatenation unit 1071c concatenates and interleaves the ACKs/NACKs or bundled ACKs/NACKs, channel quality information, and SR. If the payload size (the number of bits) of the ACKs/NACKs input from the higher layer processing unit 101 is larger than a certain size, the HARQ-ACK concatenation unit 1071c executes spatial bundling and/or time-domain bundling on the ACKs/NACKs. The HARQ-ACK concatenation unit 1071c concatenates the ACKs/NACKs or bundled ACKs/NACKs, and outputs the concatenated ACKs/NACKs to the HARQ-ACK dividing unit 1071d.

The HARQ-ACK dividing unit 1071d divides the ACKs/NACKs and/or the channel quality information and/or the SR input thereto into a first ACK/NACK segment and a second ACK/NACK segment, outputs the first ACK/NACK segment to the RM (Reed-Muller) encoding unit 1071e, and outputs the second ACK/NACK segment to the RM encoding unit 1071f. The payload size (the number of bits) O(0) of the first ACK/NACK segment is expressed by expression (1). The payload size (the number of bits) $O^{(1)}$ of the second ACK/NACK is expressed by expression (2). ceil(·) represents a function that rounds up the number in parentheses.

[Math. 1]

$$O^{(0)} = \mathrm{ceil}(O/2) \qquad (1)$$

[Math. 2]

$$O^{(0)} = O - \mathrm{ceil}(O/2) \qquad (2)$$

The RM encoding unit 1071e RM-encodes the first ACK/NACK segment input thereto in accordance with expression (3), and outputs the encoded bits of the first ACK/NACK segment to the encoded bit concatenation unit 1071g. The RM encoding unit 1071f RM-encodes the second ACK/NACK segment input thereto in accordance with expression (4), and outputs the encoded bits of the second ACK/NACK segment to the encoded bit concatenation unit 1071g.

[Math. 3]

$$q_i^{(0)} = \sum_{n=0}^{O^{(0)}-1} (o_n \cdot M_{(i \bmod 32),n}) \bmod 2 \qquad (3)$$

$$(i = 0, 1, \ldots, Q^{(0)} - 1)$$

[Math. 4]

$$q_i^{(1)} = \sum_{n=0}^{O^{(1)}-1} (o_{n+o(0)} \cdot M_{(i \bmod 32),n}) \bmod 2 \qquad (4)$$

$$(i = 0, 1, \ldots, Q^{(1)} - 1)$$

In expressions (3) and (4), $M_{i,n}$ represents the base sequence of Reed-Muller. codes. FIG. 12 is a table illustrating base sequences $M_{i,n}$ according to the present invention. $Q^{(0)}$ represents the number of encoded bits of the first ACK/NACK segment. $Q^{(1)}$ represents the number of encoded bits of the first ACK/NACK segment.

The encoded bit concatenation unit 1071g concatenates the encoded bits of the first ACK/NACK segment input from the RM encoding unit 1071e and the encoded bits of the second ACK/NACK segment input from the RM encoding unit 1071f. In a case where ACKs/NACKs are to be transmitted on the PUSCH, the encoded bit concatenation unit 1071g outputs the encoded bits of the concatenated ACKs/NACKs to the interleaving unit 1071h. In a case where the ACKs/NACKs and/or the channel quality information and/or the SR are to be transmitted on the PUCCH, the encoded bit concatenation unit 1071g outputs the encoded bits of the concatenated ACKs/NACKs and/or the channel quality information and/or the SR to the PUCCH generation unit 1075.

The interleaving unit 1071g concatenates and interleaves the encoded bits of the uplink data input from the data encoding unit 1071a, the encoded bits of the channel quality information input from the channel quality information encoding unit 1071b, and the encoded bits of the concatenated ACKs/NACKs input from the encoded bit concatenation unit 1071f, and outputs the concatenated encoded bits to the PUSCH generation unit 1073.

Figure 13:
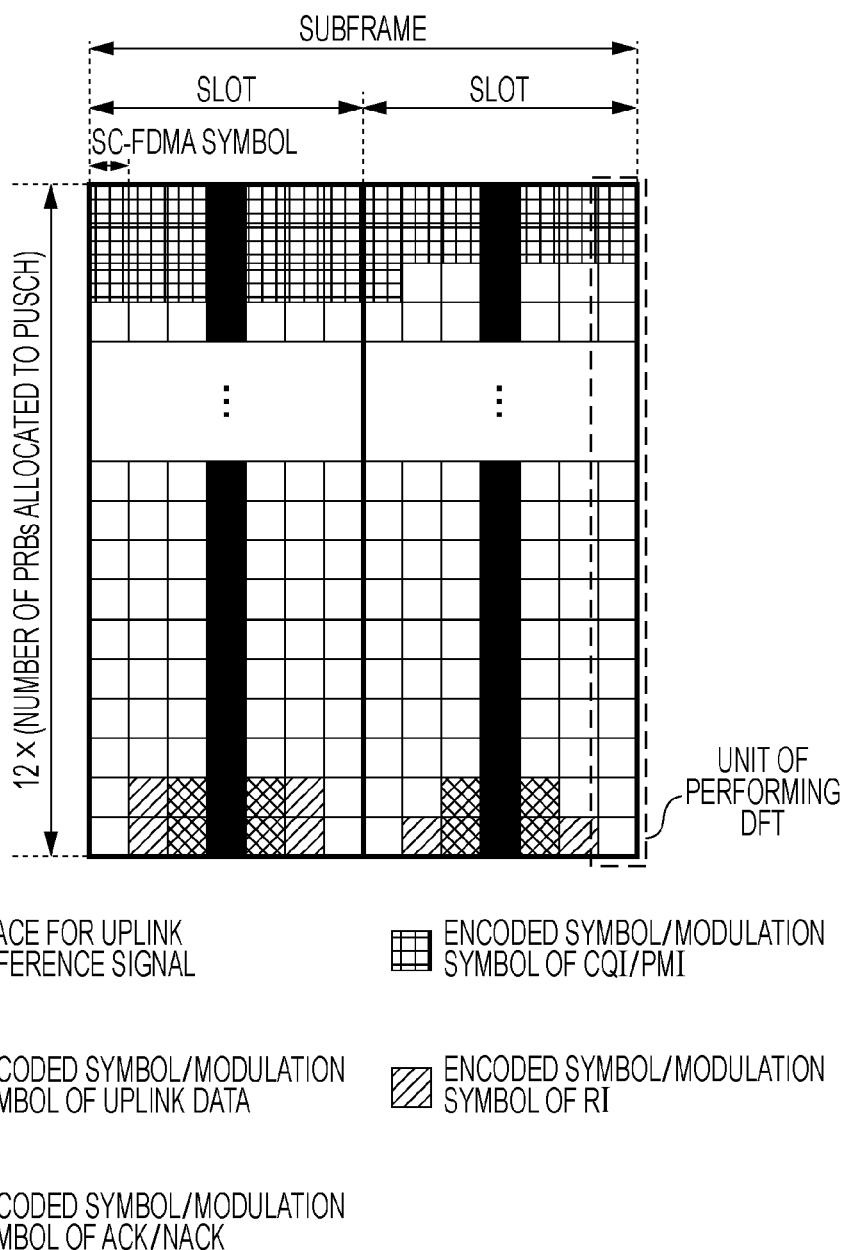
FIG. 13 is a diagram illustrating an example of executing interleave on encoded symbols according to the present invention.

FIG. 13 is a diagram illustrating an example of executing interleave on encoded symbols according to the present invention. An encoded symbol is a group of encoded bits, the number of which is equal to the modulation order of the modulation scheme for uplink data on the PUSCH, and one modulation symbol is generated by modulating one encoded symbol. In FIG. 13, there are columns, the number of which is equal to the number of SC-FDMA symbols in a subframe. Note that encoded symbols are not mapped to the fourth and eleventh columns because these columns are regions for the uplink reference signal (DMRS). In FIG. 13, there are columns, the number of which is equal to the number of subcarriers on the PUSCH for which allocation is indicated by an uplink grant.

The encoded symbols mapped to the same column in FIG. 13 are modulated, and then the modulation symbols are subjected to discrete Fourier transform (DFT). The signal obtained through the DFT is mapped to a resource element of the PUSCH for which the allocation of radio resources is indicated by an uplink grant. A signal generated from the encoded symbols in the i-th column and subjected to DFT is mapped to the resource element corresponding to the i-th SC-FDMA symbol in the subframe. The interleaving unit 1071h concatenates and interleaves the encoded symbols of uplink data, the encoded symbols of ACKs/NACKs, the encoded symbols of CQI/PMI, and the encoded symbols of RI in the manner illustrated in FIG. 10.

In a case where only SR is to be transmitted on the PUCCH, the encoding unit 1071 outputs the SR to the PUCCH generation unit 1075 without encoding the SR.

The PUSCH generation unit 1073 modulates the concatenated encoded bits input from the interleaving unit 1071h to generate modulation symbols, performs DFT on the modulation symbols mapped to the same column in FIG. 13, and outputs a PUSCH signal subjected to the DFT to the multiplexing unit 1077.

The PUCCH generation unit 1075 performs QPSK-modulation on the concatenated encoded bits of ACKs/NACKs and/or channel quality information and/or SR input from the encoded bit concatenation unit 1071g, and generates modulation symbols of the first ACK/NACK segment and modulation symbols of the second ACK/NACK segment. The PUCCH generation unit 1075 concatenates and interleaves the modulation symbols of the first ACK/NACK segment and the modulation symbols of the second ACK/NACK segment, and divides the interleaved modulation symbols into an upper modulation symbol block and a lower modulation symbol block.

The PUCCH generation unit 1075 performs code spreading on the upper modulation symbol block and the lower modulation symbol block in units of SC-FDMA symbols in the time domain, performs DFT on each of the modulation symbol blocks subjected to code spreading, and outputs PUCCH signals generated through the DFT to the multiplexing unit 1077. The PUCCH signal generated from the upper modulation symbols is transmitted using the first slot in the subframe, and the PUCCH signal generated from the lower modulation symbols is transmitted using the second slot in the subframe. Description is omitted regarding a method in which the PUCCH generation unit 1075 generates a PUCCH signal from the encoded bits of channel quality information and SR.

The uplink reference signal generation unit 10711 generates a sequence known to the base station device 3, the sequence being generated under a predetermined rule on the basis of a physical cell identity (referred to as PCI, Cell ID, or the like) for identifying the base station device 3, a bandwidth to which the uplink reference signal is mapped, a cyclic shift notified through an uplink grant, and so forth, and outputs a generated uplink reference signal to the multiplexing unit 1077.

The multiplexing unit 1075 multiplexes the PUSCH signal input from the PUSCH generation unit, and/or the PUCCH signal input from the PUCCH generation unit, and/or the uplink reference signal input from the uplink reference signal generation unit 10711, to uplink resource elements for each transmit antenna port in accordance with the control signal input from the control unit 103.

The radio transmitting unit 1077 performs inverse fast Fourier transform (IFFT) on the multiplexed signal, performs SC-FDMA modulation thereon, adds a guard interval to the SC-FDMA symbols on which SC-FDMA modulation has been performed, generates a baseband digital signal, converts the baseband digital signal into an analog signal, generates an intermediate-frequency in-phase component and quadrature component from the analog signal, removes the extra frequency components corresponding to the intermediate frequency band, converts (up converts) the intermediate-frequency signal into a high-frequency signal, removes extra frequency components, performs power amplification, and outputs the signal to the transmit/receive antenna 109 so that the signal is transmitted.

Figure 14:
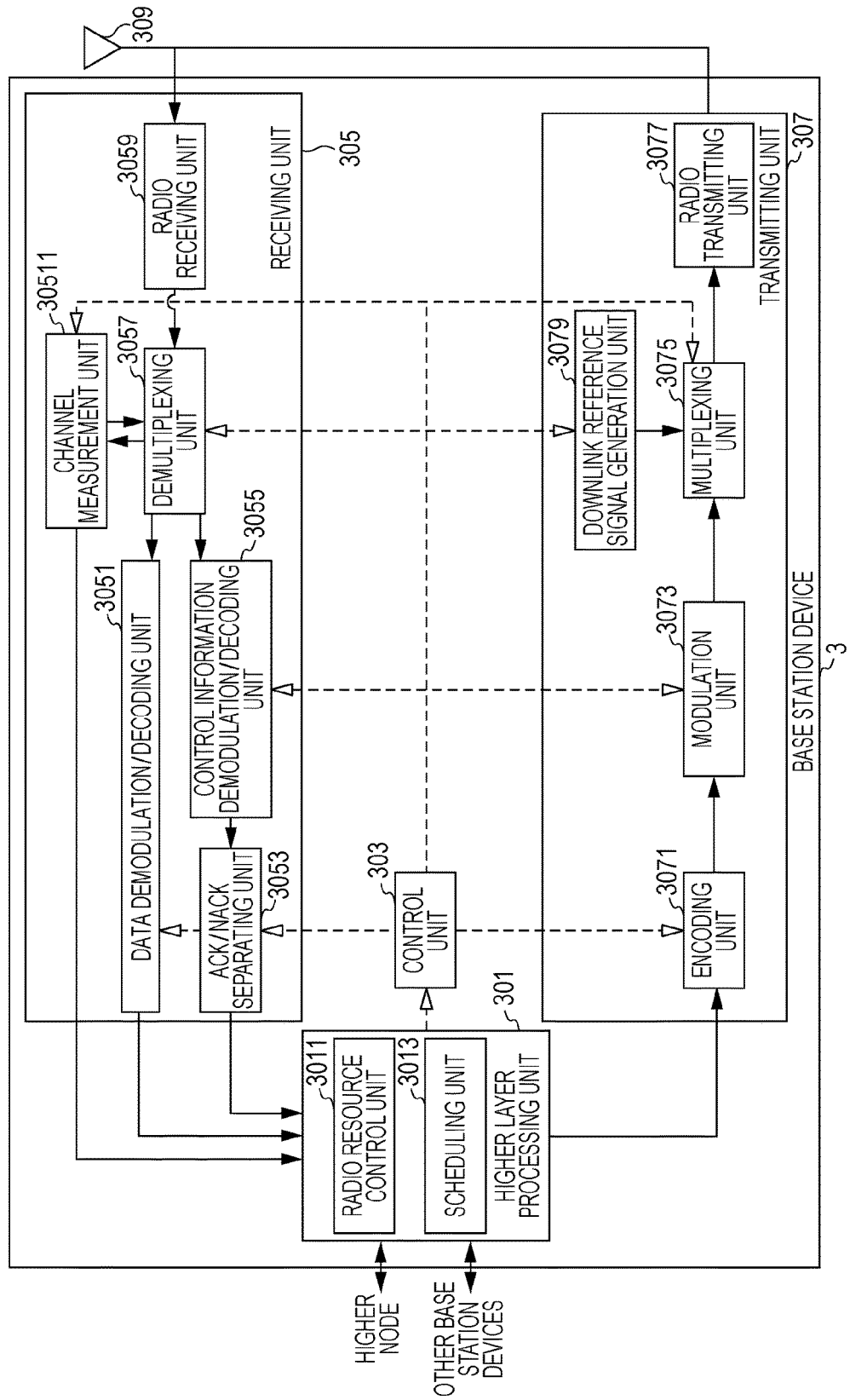
FIG. 14 is a schematic block diagram illustrating the configuration of a base station device 3 according to the present invention.

Hereinafter, the device configuration of the base station device 3 according to the present invention will be described. FIG. 14 is a schematic block diagram illustrating the configuration of the base station device 3 according to the present invention. As illustrated in the figure, the base station device 3 includes a higher layer processing unit 301, a control unit 303, a receiving unit 305, a transmitting unit 307, and a transmit/receive antenna 309. The higher layer processing unit 301 includes a radio resource control unit 3011 and a scheduling unit 3013. The receiving unit 305 includes a data demodulation/decoding unit 3051, an ACK/NACK separating unit 3053, a control information demodulation/decoding unit 3055, a demultiplexing unit. 3057, a radio receiving unit 3059, and a channel measurement unit 30511. The transmitting unit 307 includes an encoding unit 3071, a modulation unit 3073, a multiplexing unit 3075, a radio transmitting unit 3077, and a downlink reference signal generation unit 3079.

The higher layer processing unit 301 performs processing of a medium access control (MAC) layer, a packet data convergence protocol (PDCP) layer, a radio link control (RLC) layer, and a radio resource control (RRC) layer. Also, the higher layer processing unit 301 generates control information to control the receiving unit 305 and the transmitting unit 307, and outputs the control information to the control unit 303.

The radio resource control unit 3011 included in the higher layer processing unit 301 generates downlink data, an RRC signal, and a MAC CE (Control Element) which are to be mapped to the PDSCH in downlink, or acquires them from a higher node, and outputs them to the HARQ control unit 3013. Also, the radio resource control unit 3011 manages various pieces of setting information about each of the mobile station devices 1. For example, the radio resource control unit 3011 manages serving cells which are set for the mobile station devices 1.

The scheduling unit 3013 included in the higher layer processing unit 301 manages the radio resources for the PUSCH and PUCCH, which are allocated to the mobile station devices 1. In the case of having allocated radio resources for the PUSCH to the mobile station devices 1, the scheduling unit 3013 generates an uplink grant indicating the allocation of the radio resources for the PUSCH, and outputs the generated uplink grant to the transmitting unit 307.

The control unit 303 generates a control signal to control the receiving unit 305 and the transmitting unit 307, on the basis of the control information from the higher layer processing unit 301. The control unit 303 outputs the generated control signal to the receiving unit 305 and the transmitting unit 307, and controls the receiving unit 305 and the transmitting unit 307.

The receiving unit 305 demultiplexes, demodulates, and decodes the reception signals received from the mobile station devices 1 via the transmit/receive antenna 309 in accordance with the control signal input from the control unit 303, and outputs the decoded information to the higher layer processing unit 301.

The radio receiving unit 3059 converts (down coverts) an uplink signal received via the transmit/receive antenna 309 into an intermediate-frequency signal, removes unnecessary frequency components, controls the amplification level so that the signal level is appropriately maintained, orthogonally demodulates the received signal on the basis of the in-phase component and quadrature component of the received signal, and converts the orthogonally demodulated analog signal into a digital signal. The radio receiving unit 3059 removes a portion corresponding to a guard interval (GI) from the converted digital signal. The radio receiving unit 3059 performs fast Fourier transform (FFT) on the signal from which the guard interval has been removed, extracts a signal in the frequency domain, and outputs the extracted signal to the demultiplexing unit 3057.

The demultiplexing unit 3057 demultiplexes the signal input from the radio receiving unit 3059 into signals such as the PUCCH, the PUSCH, and the uplink reference signal. The demultiplexing is performed on the basis of radio resource allocation information included in an uplink grant which is determined in advance by the base station device 3 using the radio resource control unit 3011 and which is notified to the individual mobile station devices 1. The demultiplexing unit 3057 performs channel compensation for the PUCCH and PUSCH using the estimated values of the channels input from the channel measurement unit 30511. Also, the demultiplexing unit 3057 outputs the uplink reference signal obtained through demultiplexing to the channel measurement unit 30511.

The demultiplexing unit 3057 performs inverse discrete Fourier transform (IDFT) on the PUCCH and PUSCH signals obtained through demultiplexing, and obtains modulation symbols of the uplink data and modulation symbols of the uplink control information (ACK/NACK). The demultiplexing unit 3057 outputs the modulation symbols of the uplink data obtained from the PUSCH signal to the data demodulation/decoding unit 3051. The demultiplexing unit 3055 outputs the modulation symbols of the uplink control information (ACK/NACK) obtained from the PUCCH signal or PUSCH signal to the control information demodulation/decoding unit 3055.

The channel measurement unit 30511 measures the estimated values of channels, the quality of the channels, and so forth from the uplink reference signal input from the demultiplexing unit 3057, and outputs the results to the demultiplexing unit 3057 and the higher layer processing unit 301.

The data demodulation/decoding unit 3051 demodulates the modulation symbols of the uplink data input from the demultiplexing unit 3057, decodes the encoded bits of the demodulated uplink data, and outputs the decoded uplink data to the higher layer processing unit 301.

The control information demodulation/decoding unit 3055 decodes the first ACK/NACK segment by applying the maximum likelihood decision or the like to the modulation symbols corresponding to the first ACK/NACK segment among the modulation symbols of the ACKs/NACKs input from the demultiplexing unit 3057. The control information demodulation/decoding unit 3055 decodes the second ACK/NACK segment by applying the maximum likelihood decision or the like to the modulation symbols corresponding to the second ACK/NACK segment among the modulation symbols of the ACKs/NACKs input from the demultiplexing unit 3057. The control information demodulation/decoding unit 3055 concatenates the decoded first ACK/NACK segment and second ACK/NACK segment, and outputs the concatenated ACKs/NACKs and/or channel quality information and/or SR to the ACK/NACK separating unit 3053. Description is omitted regarding demodulation/decoding processing in a case where only channel quality information or SR is transmitted on the PUCCH.

The ACK/NACK separating unit 3053 separates the ACKs/NACKs input from the control information demodulation/decoding unit 3055 into ACKs/NACKs for the individual cells in individual subframes, and outputs the separated ACKs/NACKs to the higher layer processing unit 301. The ACK/NACK separating unit 3053 determines the subframes and cells to which the ACKs/NACKs correspond, and outputs the ACKs/NACKs for the individual cells in the individual subframes to the higher layer processing unit 301. The ACK/NACK separating unit 3053 outputs the channel quality information and SR to the higher layer processing unit 301 without performing any processing thereon.

In a case where the ACKs/NACKs input from the control information demodulation/decoding unit 3055 are bundled, the ACK/NACK separating unit 3053 generates a plurality of ACKs/NACKs corresponding to the bundled ACKs/NACKs. In a case where the bundled ACKs/NACKs are ACKs, the ACK/NACK separating unit 3053 generates ACKs as all the plurality of ACKs/NACKs corresponding to the bundled ACKs/NACKs. In a case where the bundled ACKs/NACKs are NACKs, the ACK/NACK separating unit 3053 generates NACKs as all the plurality of ACKs/NACKs corresponding to the bundled ACKs/NACKs.

The transmitting unit 307 generates a downlink reference signal in accordance with the control signal input from the control unit 303, encodes and modulates the HARQ indicator, downlink control information, and downlink data input from the higher layer processing unit 301, multiplexes the PHICH, the PDCCH, the PDSCH, and the downlink reference signal, and transmits the signal to the mobile station device 1 via the transmit/receive antenna 309.

The encoding unit 3071 encodes the HARQ indicator, downlink control information, and downlink data input from the higher layer processing unit 301 using a predetermined coding format such as block coding, convolutional coding, or turbo coding, or using a coding format determined by the radio resource control unit 3011. The modulation unit 3073 modulates the encoded bits input from the encoding unit 3071 using a predetermined modulation scheme such as BPSK, QPSK, 16QAM, or 64QAM or using a modulation scheme determined by the radio resource control unit 3011.

The downlink reference signal generation unit 3079 generates, as a downlink reference signal, a sequence known to the mobile station devices 1, the sequence being generated under a predetermined rule on the basis of a physical cell identity (PCI) for identifying the base station device 3 or the like. The multiplexing unit 3075 multiplexes the modulation symbols for each channel, which have been modulated, and the generated downlink reference signal.

The radio transmitting unit 3077 performs inverse fast Fourier transform (IFFT) on the multiplexed modulation symbols and so forth, performs OFDM modulation, adds a guard interval to the OFDM symbols on which OFDM modulation has been performed, generates a baseband digital signal, converts the baseband digital signal into an analog signal, generates an intermediate-frequency in-phase component and quadrature component from the analog signal, removes the extra frequency components for the intermediate-frequency band, converts (up converts) the intermediate-frequency signal into a high-frequency signal, removes extra frequency components, performs power amplification, and outputs the signal to the transmit/receive antenna 309 so that the signal is transmitted.

Figure 15:
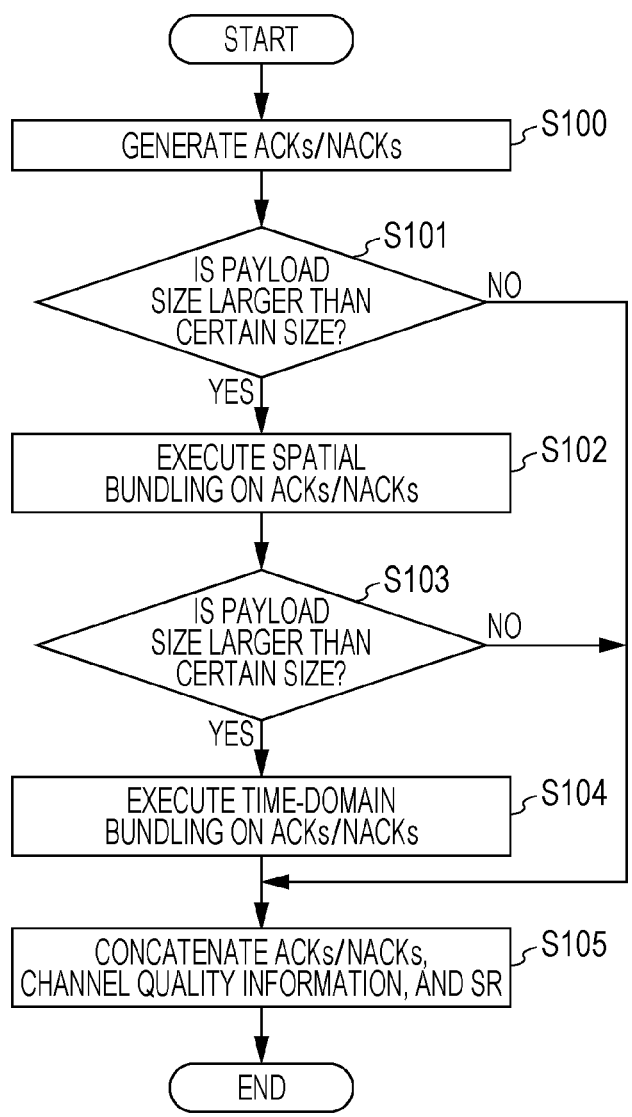
FIG. 15 is a flowchart illustrating an example of the operation of each of the mobile station devices 1 according to the present invention.

Hereinafter, the operation of each of the mobile station devices 1 according to the present invention will be described with reference to a flowchart. FIG. 15 is the flowchart illustrating an example of the operation of each of the mobile station devices 1 according to the present invention. The mobile station device 1 generates ACKs/NACKs for a subframe group in which ACKs/NACKs for cells in individual subframes are transmitted together on the physical channel of the same subframe (step S100).

If the payload size of the ACKs/NACKs generated in step S100 is larger than a certain size (Yes in step S101), the mobile station device 1 executes spatial bundling on the ACKs/NACKs in units of cells, in order from the secondary cell having the largest cell index, and tries to set the payload size of the ACKs/NACKs to be smaller than or equal to the certain size (step S102). If the payload size of the ACKs/NACKs generated in step S100 is smaller than or equal to the certain size (No in step S101), the mobile station device 1 proceeds to step S105.

If the payload size of the ACKs/NACKs generated by executing spatial bundling on all the serving cells in step S102 is larger than the certain size (Yes in step S103), the mobile station device 1 executes time-domain bundling on the ACKs/NACKs in units of cells, in order from the secondary cell having the largest cell index, and tries to set the payload size of the ACKs/NACKs to be smaller than or equal to the certain size (step S104). If the payload size of the ACKs/NACKs generated in step S102 is smaller than or equal to the certain size (No in step S103), the mobile station device 1 proceeds to step S105.

The mobile station device 1 concatenates and/or interleaves the ACKs/NACKs which are bundled or not bundled in step S102 and/or step S104 (step S105). In a case where the ACKs/NACKs, channel quality information, and SR are to be transmitted together on the same PUCCH, the ACKs/NACKs which are bundled or not bundled in step S102 and/or step S104, the channel quality information, and the SR are concatenated and/or interleaved together in step S105. After step S105 ends, the mobile station device 1 ends the process of bundling and concatenating the ACKs/NACKs.

Accordingly, the mobile station device 1 is capable of executing processing on uplink control information (ACKs/NACKs) by effectively using uplink resources, when transmitting the uplink control information (ACKs/NACKs).

A program operated in the base station device 3 and the mobile station devices 1 according to the present invention may be a program (program causing a computer to function) for controlling a CPU (Central Processing Unit) or the like so as to realize the functions of the above-described embodiment according to the present invention. The information handled in these devices is temporarily stored in a RAM (Ransom Access Memory) during processing of the information, is then stored in various kinds of ROMs such as a flash ROM (Read Only Memory) or an HDD (Hard Disk Drive), and is read out, corrected, or written by the CPU as necessary.

(a) The present invention may also include the following embodiments. That is, a mobile station device according to the present invention is a mobile station device that communicates with a base station device using a plurality of cells which are set by the base station device, and executes a process of concatenating ACKs/NACKs for a plurality of cells in a plurality of subframes in order from ACKs/NACKs for the plurality of cells in the first subframe, and a process of, after concatenating all the ACKs/NACKs for the plurality of cells in a certain subframe, concatenating ACKs/NACKs for the plurality of cells in the next subframe in order.

(b) A mobile station device according to the present invention is a mobile station device that communicates with a base station device using a plurality of cells which are set by the base station device, and executes a process of interleaving ACKs/NACKs for a plurality of cells in a plurality of subframes.

(c) According to the present invention, the foregoing mobile station device executes a process of interleaving the ACKs/NACKs and channel state information together.

(d) According to the present invention, the foregoing mobile station device executes a process of interleaving the ACKs/NACKs and a scheduling request together.

(e) A mobile station device according to the present invention is a mobile station device that communicates with a base station device using a plurality of cells which are set by the base station device, and executes, in a case where the payload size of ACKs/NACKs for a plurality of cells in a plurality of subframes is larger than a certain size, a process of executing spatial bundling on ACKs/NACKs for a cell in order until the payload size of the ACKs/NACKs becomes smaller than or equal to the certain size.

(f) According to the present invention, the foregoing mobile station device executes a process of executing spatial bundling on ACKs/NACKs for a secondary cell in order from the secondary cell among the plurality of cells.

(g) According to the present invention, in a case where a plurality of secondary cells are set, the foregoing mobile station device executes a process of executing spatial bundling on ACKs/NACKs in accordance with the priority for the secondary cells notified from the base station device.

(h) A mobile station device according to the present invention is a mobile station device that communicates with a base station device using a plurality of cells which are set by the base station device, and executes, in a case where the payload size of ACKs/NACKs for a plurality of cells in a plurality of subframes is larger than a certain size, a process of executing time-domain bundling on ACKs/NACKs for a cell in order until the payload size of the ACKs/NACKs becomes smaller than or equal to the certain size.

(i) According to the present invention, the foregoing mobile station device executes a process of executing time-domain bundling on ACKs/NACKs for a secondary cell in order from the secondary cell among the plurality of cells.

(j) According to the present invention, in a case where a plurality of secondary cells are set, the foregoing mobile station device executes a process of executing time-domain bundling on ACKs/NACKs in accordance with the priority for the secondary cells notified from the base station device.

(k) A mobile station device according to the present invention is a mobile station device that communicates with a base station device using a plurality of cells which are set by the base station device, and executes a process of executing spatial bundling on all ACKs/NACKs for a plurality of cells in a plurality of subframes, and a process of executing time-domain bundling on ACKs/NACKs for a cell in a case where the payload size of the spatially bundled ACKs/NACKs is larger than the certain size.

(l) A base station device according to the present invention is a base station device that communicates with a mobile station device using a plurality of cells which are set by the base station device. The mobile station device executes a process of concatenating ACKs/NACKs for a plurality of cells in a plurality of subframes in order from ACKs/NACKs for the plurality of cells in the first subframe, and a process of, after concatenating all ACKs/NACKs for the plurality of cells in a certain subframe, concatenating ACKs/NACKs for the plurality of cells in the next subframe in order. On the other hand, the base station device executes a process of separating, from the concatenated ACKs/NACKs, ACKs/NACKs for the plurality of cells in the plurality of subframes.

(m) A base station device according to the present invention is a base station device that communicates with a mobile station device using a plurality of cells which are set by the base station device. The mobile station device executes a process of interleaving ACKs/NACKs for a plurality of cells in a plurality of subframes. On the other hand, the base station device executes a process of separating, from the interleaved ACKs/NACKs, ACKs/NACKs for the plurality of cells in the plurality of subframes.

(n) A base station device according to the present invention is a base station device that communicates with a mobile station device using a plurality of cells which are set by the base station device. The mobile station device executes, in a case where the payload size of ACKs/NACKs for a plurality of cells in a plurality of subframes is larger than a certain size, a process of executing spatial bundling on ACKs/NACKs for a cell in order until the payload size of the ACKs/NACKs becomes smaller than or equal to the certain size. On the other hand, the base station device executes a process of separating, from the ACKs/NACKs on which the spatial bundling has been executed, ACKs/NACKs for the plurality of cells in the plurality of subframes.

(o) A base station device according to the present invention is a base station device that communicates with a mobile station device using a plurality of cells which are set by the base station device. The mobile station device executes, in a case where the payload size of ACKs/NACKs for a plurality of cells in a plurality of subframes is larger than a certain size, a process of executing time-domain bundling on ACKs/NACKs for a cell in order until the payload size of the ACKs/NACKs becomes smaller than or equal to the certain size. On the other hand, the base station device executes a process of separating, from the ACKs/NACKs on which the time-domain bundling has been executed, ACKs/NACKs for the plurality of cells in the plurality of subframes.

(p) A base station device according to the present invention is a base station device that communicates with a mobile station device using a plurality of cells which are set by the base station device. The mobile station device executes a process of executing spatial bundling on all ACKs/NACKs for a plurality of cells in a plurality of subframes, and a process of executing time-domain bundling on ACKs/NACKs for a cell in a case where the payload size of the spatially bundled ACKs/NACKs is larger than the certain size. On the other hand, the base station device executes a process of separating, from the ACKs/NACKs on which the time-domain bundling and spatial bundling have been executed, ACKs/NACKs for the plurality of cells in the plurality of subframes.

(q) A wireless communication system according to the present invention is a wireless communication system in which a mobile station device and a base station device communicate with each other using a plurality of cells which are set by the base station device. The mobile station device executes a process of concatenating ACKs/NACKs for a plurality of cells in a plurality of subframes in order from ACKs/NACKs for the plurality of cells in the first subframe, and a process of, after concatenating all the ACKs/NACKs for the plurality of cells in a certain subframe, concatenating ACKs/NACKs for the plurality of cells in the next subframe in order. The base station device executes a process of separating, from the concatenated ACKs/NACKs, ACKs/NACKs for the plurality of cells in the plurality of subframes.

(r) A wireless communication system according to the present invention is a wireless communication system in which a mobile station device and a base station device communicate with each other using a plurality of cells which are set by the base station device. The mobile station device executes a process of interleaving ACKs/NACKs for a plurality of cells in a plurality of subframes. The base station device executes a process of separating, from the interleaved ACKs/NACKs, ACKs/NACKs for the plurality of cells in the plurality of subframes.

(s) A wireless communication system according to the present invention is a wireless communication system in which a mobile station device and a base station device communicate with each other using a plurality of cells which are set by the base station device. The mobile station device executes, in a case where the payload size of ACKs/NACKs for a plurality of cells in a plurality of subframes is larger than a certain size, a process of executing spatial bundling on ACKs/NACKs for a cell in order until the payload size of the ACKs/NACKs becomes smaller than or equal to the certain size. The base station device executes a process of separating, from the ACKs/NACKs on which the spatial bundling has been executed, ACKs/NACKs for the plurality of cells in the plurality of subframes.

(t) A wireless communication system according to the present invention is a wireless communication system in which a mobile station device and a base station device communicate with each other using a plurality of cells which are set by the base station device. The mobile station device executes, in a case where the payload size of ACKs/NACKs for a plurality of cells in a plurality of subframes is larger than a certain size, a process of executing time-domain bundling on ACKs/NACKs for a cell in order until the payload size of the ACKs/NACKs becomes smaller than or equal to the certain size. The base station device executes a process of separating, from the ACKs/NACKs on which the time-domain bundling has been executed, ACKs/NACKs for the plurality of cells in the plurality of subframes.

(u) A wireless communication system according to the present invention is a wireless communication system in which a mobile station device and a base station device communicate with each other using a plurality of cells which are set by the base station device. The mobile station device executes a process of executing spatial bundling on all ACKs/NACKs for a plurality of cells in a plurality of subframes, and a process of executing time-domain bundling on ACKs/NACKs for a cell in a case where the payload size of the spatially bundled ACKs/NACKs is larger than the certain size. The base station device executes a process of separating, from the ACKs/NACKs on which the time-domain bundling and spatial bundling have been executed, ACKs/NACKs for the plurality of cells in the plurality of subframes.

(v) A wireless communication method according to the present invention is a wireless communication method used for a mobile station device that communicates with a base station device using a plurality of cells which are set by the base station device, and includes a process of concatenating ACKs/NACKs for a plurality of cells in a plurality of subframes in order from ACKs/NACKs for the plurality of cells in the first subframe, and a process of, after concatenating all the ACKs/NACKs for the plurality of cells in a certain subframe, concatenating ACKs/NACKs for the plurality of cells in the next subframe in order.

(w) A wireless communication method according to the present invention is a wireless communication method used for a mobile station device that communicates with a base station device using a plurality of cells which are set by the base station device, and includes a process of interleaving ACKs/NACKs for a plurality of cells in a plurality of subframes.

(x) A wireless communication method according to the present invention is a wireless communication method used for a mobile station device that communicates with a base station device using a plurality of cells which are set by the base station device, and includes a process of, in a case where the payload size of ACKs/NACKs for a plurality of cells in a plurality of subframes is larger than a certain size, executing spatial bundling on ACKs/NACKs for a cell in order until the payload size of the ACKs/NACKs becomes smaller than or equal to the certain size.

(y) A wireless communication method according to the present invention is a wireless communication method used for a mobile station device that communicates with a base station device using a plurality of cells which are set by the base station device, and includes a process of, in a case where the payload size of ACKs/NACKs for a plurality of cells in a plurality of subframes is larger than a certain size, executing time-domain bundling on ACKs/NACKs for a cell in order until the payload size of the ACKs/NACKs becomes smaller than or equal to the certain size.

(z) A wireless communication method according to the present invention is a wireless communication method used for a mobile station device that communicates with a base station device using a plurality of cells which are set by the base station device, and includes a process of executing spatial bundling on all ACKs/NACKs for a plurality of cells in a plurality of subframes, and a process of executing time-domain bundling on ACKs/NACKs for a cell in a case where the payload size of the spatially bundled ACKs/NACKs is larger than the certain size.

(A) A wireless communication method according to the present invention is a wireless communication method used for a base station device that communicates with a mobile station device using a plurality of cells which are set by the base station device. In this method, the mobile station device executes a process of concatenating ACKs/NACKs for a plurality of cells in a plurality of subframes in order from ACKs/NACKs for the plurality of cells in the first subframe, and a process of, after concatenating all ACKs/NACKs for the plurality of cells in a certain subframe, concatenating ACKs/NACKs for the plurality of cells in the next subframe in order. On the other hand, the base station device executes a process of separating, from the concatenated ACKs/NACKs, ACKs/NACKs for the plurality of cells in the plurality of subframes.

(B) A wireless communication method according to the present invention is a wireless communication method used for a base station device that communicates with a mobile station device using a plurality of cells which are set by the base station device. In this method, the mobile station device executes a process of interleaving ACKs/NACKs for a plurality of cells in a plurality of subframes. On the other hand, the base station device executes a process of separating, from the interleaved ACKs/NACKs, ACKs/NACKs for the plurality of cells in the plurality of subframes.

(C) A wireless communication method according to the present invention is a wireless communication method used for a base station device that communicates with a mobile station device using a plurality of cells which are set by the base station device. In this method, the mobile station device executes, in a case where the payload size of ACKs/NACKs for a plurality of cells in a plurality of subframes is larger than a certain size, a process of executing spatial bundling on ACKs/NACKs for a cell in order until the payload size of the ACKs/NACKs becomes smaller than or equal to the certain size. On the other hand, the base station device executes a process of separating, from the ACKs/NACKs on which the spatial bundling has been executed, ACKs/NACKs for the plurality of cells in the plurality of subframes.

(D) A wireless communication method according to the present invention is a wireless communication method used for a base station device that communicates with a mobile station device using a plurality of cells which are set by the base station device. In this method, the mobile station device executes, in a case where the payload size of ACKs/NACKs for a plurality of cells in a plurality of subframes is larger than a certain size, a process of executing time-domain bundling on ACKs/NACKs for a cell in order until the payload size of the ACKs/NACKs becomes smaller than or equal to the certain size. On the other hand, the base station device executes a process of separating, from the ACKs/NACKs on which the time-domain bundling has been executed, ACKs/NACKs for the plurality of cells in the plurality of subframes.

(E) A wireless communication method according to the present invention is a wireless communication method used for a base station device that communicates with a mobile station device using a plurality of cells which are set by the base station device. In this method, the mobile station device executes a process of executing spatial bundling on all ACKs/NACKs for a plurality of cells in a plurality of subframes, and a process of executing time-domain bundling on ACKs/NACKs for a cell in a case where the payload size of the spatially bundled ACKs/NACKs is larger than the certain size. On the other hand, the base station device executes a process of separating, from the ACKs/NACKs on which the time-domain bundling and spatial bundling have been executed, ACKs/NACKs for the plurality of cells in the plurality of subframes.

(F) An integrated circuit according to the present invention is an integrated circuit used for a mobile station device that communicates with a base station device using a plurality of cells which are set by the base station device, and is formed of a chip so as to be capable of executing a series or processes including a process of concatenating ACKs/NACKs for a plurality of cells in a plurality of subframes in order from ACKs/NACKs for the plurality of cells in the first subframe, and a process of, after concatenating all the ACKs/NACKs for the plurality of cells in a certain subframe, concatenating ACKs/NACKs for the plurality of cells in the next subframe in order.

(G) An integrated circuit according to the present invention is an integrated circuit used for a mobile station device that communicates with a base station device using a plurality of cells which are set by the base station device, and is formed of a chip so as to be capable of executing a process of interleaving ACKs/NACKs for a plurality of cells in a plurality of subframes.

(H) An integrated circuit according to the present invention is an integrated circuit used for a mobile station device that communicates with a base station device using a plurality of cells which are set by the base station device, and is formed of a chip so as to be capable of executing a process of, in a case where the payload size of ACKs/NACKs for a plurality of cells in a plurality of subframes is larger than a certain size, executing spatial bundling on ACKs/NACKs for a cell in order until the payload size of the ACKs/NACKs becomes smaller than or equal to the certain size.

(I) An integrated circuit according to the present invention is an integrated circuit used for a mobile station device that communicates with a base station device using a plurality of cells which are set by the base station device, and is formed of a chip so as to be capable of executing a process of, in a case where the payload size of ACKs/NACKs for a plurality of cells in a plurality of subframes is larger than a certain size, executing time-domain bundling on ACKs/NACKs for a cell in order until the payload size of the ACKs/NACKs becomes smaller than or equal to the certain size.

(J) An integrated circuit according to the present invention is an integrated circuit used for a mobile station device that communicates with a base station device using a plurality of cells which are set by the base station device, and is formed of a chip so as to be capable of executing a series of processes including a process of executing spatial bundling on all ACKs/NACKs for a plurality of cells in a plurality of subframes, and a process of executing time-domain bundling on ACKs/NACKs for a cell in a case where the payload size of the spatially bundled ACKs/NACKs is larger than the certain size.

(K) An integrated circuit according to the present invention is an integrated circuit used for a base station device that communicates with a mobile station device using a plurality of cells which are set by the base station device, and is formed of a chip so as to be capable of executing, with the mobile station device, a process of concatenating ACKs/NACKs for a plurality of cells in a plurality of subframes in order from ACKs/NACKs for the plurality of cells in the first subframe, and a process of, after concatenating all ACKs/NACKs for the plurality of cells in a certain subframe, concatenating ACKs/NACKs for the plurality of cells in the next subframe in order, and executing, with the base station device, a process of separating, from the concatenated ACKs/NACKs, ACKs/NACKs for the plurality of cells in the plurality of subframes.

(L) An integrated circuit according to the present invention is an integrated circuit used for a base station device that communicates with a mobile station device using a plurality of cells which are set by the base station device, and is formed of a chip so as to be capable of executing, with the mobile station device, a process of interleaving ACKs/NACKs for a plurality of cells in a plurality of subframes, and executing, with the base station device, a process of separating, from the interleaved ACKs/NACKs, ACKs/NACKs for the plurality of cells in the plurality of subframes.

(M) An integrated circuit according to the present invention is an integrated circuit used for a base station device that communicates with a mobile station device using a plurality of cells which are set by the base station device, and is formed of a chip so as to be capable of executing, with the mobile station device, in a case where the payload size of ACKs/NACKs for a plurality of cells in a plurality of subframes is larger than a certain size, a process of executing spatial bundling on ACKs/NACKs for a cell in order until the payload size of the ACKs/NACKs becomes smaller than or equal to the certain size, and executing, with the base station device, a process of separating, from the ACKs/NACKs on which the spatial bundling has been executed, ACKs/NACKs for the plurality of cells in the plurality of subframes.

(N) An integrated circuit according to the present invention is an integrated circuit used for a base station device that communicates with a mobile station device using a plurality of cells which are set by the base station device, and is formed of a chip so as to be capable of executing, with the mobile station device, in a case where the payload size of ACKs/NACKs for a plurality of cells in a plurality of subframes is larger than a certain size, a process of executing time-domain bundling on ACKs/NACKs for a cell in order until the payload size of the ACKs/NACKs becomes smaller than or equal to the certain size, and executing, with the base station device, a process of separating, from the ACKs/NACKs on which the time-domain bundling has been executed, ACKs/NACKs for the plurality of cells in the plurality of subframes.

(O) An integrated circuit according to the present invention is an integrated circuit used for a base station device that communicates with a mobile station device using a plurality of cells which are set by the base station device, and is formed of a chip so as to be capable of executing, with the mobile station device, a process of executing spatial bundling on all ACKs/NACKs for a plurality of cells in a plurality of subframes, and a process of executing time-domain bundling on ACKs/NACKs for a cell in a case where the payload size of the spatially bundled ACKs/NACKs is larger than the certain size, and executing, with the base station device, a process of separating, from the ACKs/NACKs on which the time-domain bundling and spatial bundling have been executed, ACKs/NACKs for the plurality of cells in the plurality of subframes.

Part of the mobile station devices 1 and the base station device 3 according to the above-described embodiment may be implemented by a computer. In that case, a program for implementing this control function may be recorded on a computer-readable recording medium, and a computer system may be caused to read and execute the program recorded on the recording medium.

Here, the "computer system" is a computer system included in each of the mobile station devices 1 or the base station device 3, and includes hardware such as an OS and peripheral devices. The "computer-readable recording medium" is a portable medium such as a flexible disk, a magneto-optical disk, a ROM, or a CD-ROM, or a storage device such as a hard disk included in the computer system.

Furthermore, the "computer-readable recording medium" may also include an object that dynamically holds a program for a short time, such as a communication line used to transmit the program via a network such as the Internet or a communication line such as a telephone line, and an object that holds a program for a certain period of time, such as a volatile memory in a computer system serving as a server or a client in this case. Also, the above-described program may implement some of the above-described functions, or may be implemented by combining the above-described functions with a program which has already been recorded on a computer system.

Furthermore, part or whole of the mobile station devices 1 and the base station device 3 in the above-described embodiment may be implemented as an LSI, which is typically an integrated circuit, or as a chip set. The individual functional blocks of the mobile station devices 1 and the base station device 3 may be individually formed into chips, or some or all of the functional blocks may be integrated into a chip. The method for forming an integrated circuit is not limited to LSI, and may be implemented by a dedicated circuit or a general-purpose processor. In a case where the progress of semiconductor technologies produces an integration technology which replaces an LSI, an integrated circuit according to the technology may be used.

While an embodiment of the present invention has been described in detail with reference to the drawings, specific configurations are not limited to those described above, and various design modifications and so forth can be made without deviating from the gist of the present invention.

REFERENCE SIGNS LIST 1 (1A, 1B, 1C) mobile station device
3 base station device
101 higher layer processing unit
103 control unit
105 receiving unit
107 transmitting unit
1011 radio resource control unit
1013 scheduling unit
1051 decoding unit
1053 demodulation unit
1055 demultiplexing unit
1057 radio receiving unit
1059 channel measurement unit
1071 encoding unit
1073 PUSCH generation unit
1075 PUCCH generation unit
1077 multiplexing unit
1079 radio transmitting unit
10711 uplink reference signal generation unit
1071$a$ data encoding unit
1071$b$ channel quality information encoding unit
1071$c$ HARQ-ACK concatenation unit
1071$d$ HARQ-ACK dividing unit
1071$e$ RM encoding unit
1071$f$ RM encoding unit
1071$g$ encoded bit concatenation unit
1071$h$ interleaving unit
301 higher layer processing unit
303 control unit
305 receiving unit
307 transmitting unit
3011 radio resource control unit
3013 scheduling unit
3051 data demodulation/decoding unit
3053 ACK/NACK separating unit
3055 control information demodulation/decoding unit
3057 demultiplexing unit
3059 radio receiving unit
30511 channel measurement unit
3071 encoding unit
3073 modulation unit
3075 multiplexing unit
3077 radio transmitting unit
3079 downlink reference signal generation unit

The invention claimed is:

1. A mobile station device that is configured to, programmed to, or configured to and programmed to communicate with a base station device by using a plurality of cells which are aggregated, the mobile station device comprising:
generating circuitry configured to, programmed to, or configured to and programmed to generate a plurality of Acknowledgments/Negative-Acknowledgments (ACK/NACK) sequences by interleaving, together, a scheduling request and a plurality of ACKs/NACKs for a plurality of cells and a plurality of subframes;
encoding circuitry configured to, programmed to, or configured to and programmed to separately encode, by using a single set of base sequences, the plurality of ACK/NACK sequences; and
transmitting circuitry configured to, programmed to, or configured to and programmed to transmit the plurality of encoded ACK /NACK sequences on a physical uplink control channel in a subframe.

2. A mobile station device that is configured to, programmed to, or configured to and programmed to transmit on a single physical channel, to a base station device, Acknowledgments or Negative-Acknowledgments (ACKs or NACKs) corresponding to individual transport blocks received in one or a plurality of subframes in a plurality of cells, a transmission mode being set for at least one of the plurality of cells by the base station device, the transmission mode enabling two transport blocks to be transmitted in one subframe using spatial multiplexing, the mobile station device comprising:
determining circuitry configured to, programmed to, or configured to and programmed to determine, in accordance with the number of bits of the ACKs and/or NACKs, whether or not to execute spatial bundling on ACKs or NACKs for the cell in the transmission mode;
transmitting circuitry configured to, programmed to, or configured to and programmed to transmit the ACKs and/or NACKs; and
generating circuitry configured to, programmed to, or configured to and programmed to, in a case of receiving one transport block in the cell in the transmission mode in a certain subframe, generate an ACK or a NACK in response to the received one transport block in the cell in the transmission mode in the certain subframe, and to generate a NACK in response to a transport block which has not been received in the cell in the transmission mode in the certain subframe by the mobile station device in a case of having determined not to execute the spatial bundling on the ACKs or NACKs for the cell in the transmission mode,
wherein, the generating circuit is configured to, programmed to, or configured to and programmed to, in a case of receiving one transport block in the cell in the transmission mode in a certain subframe, generate an ACK or a NACK in response to the received one transport block in the cell in the transmission mode in the certain subframe, and not to generate a NACK in response to a transport block which has not been received in the cell in the transmission mode in the certain subframe by the mobile station device in a case of having determined to execute the spatial bundling on the ACKs or NACKs for the cell in the transmission mode.

3. A base station device that is configured to, programmed to, or configured to and programmed to communicate with a mobile station device by using a plurality of cells which are aggregated, the base station device comprising:
receiving circuitry configured to, programmed to, or configured to and programmed to receive a plurality of encoded Acknowledgment/Negative-Acknowledgment (ACK/NACK) sequences transmitted on a physical uplink control channel in a subframe, the plurality of encoded ACK/NACK sequences being generated by, with the mobile station device, interleaving, together, a scheduling requests and a plurality of ACKs/NACKs for a plurality of cells and a plurality of subframes to generate the plurality of ACK/NACK sequences, and separately encoding the plurality of ACK/NACK sequences by using a single set of base sequences; and
decoding circuitry configured to, programmed to, or configured to and programmed to separately decode the plurality of encoded ACK/NACK sequences.

4. A base station device that is configured to, programmed to, or configured to and programmed to receive on a single physical channel, from a mobile station device, Acknowledgments or Negative-Acknowledgments (ACKs or NACKs) corresponding to individual transport blocks transmitted in one or a plurality of subframes in a plurality of cells, a transmission mode being set for at least one of the plurality of cells by the base station device, the transmission mode enabling two transport blocks to be transmitted in one subframe using spatial multiplexing, the base station device comprising:
determining circuitry configured to, programmed to, or configured to and programmed to determine, in accordance with the number of bits of the ACKs and/or NACKs, whether or not spatial bundling on ACKs or NACKs for the cell in the transmission mode is executed;
receiving circuitry configured to, programmed to, or configured to and programmed to receive the ACKs and/or NACKs, wherein
in a case of transmitting one transport block to the mobile station device in the cell in the transmission mode in a certain subframe and having determined that the spatial bundling is not executed on the ACKs or NACKs for the cell in the transmission mode by the mobile station device, an ACK or a NACK is generated by the mobile station device in response to the one transmitted transport block in the cell in the transmission mode in the certain subframe and a NACK is generated by the mobile station device in response to a transport block which has not been received in the cell in the transmission mode in the certain subframe, and
in a case of transmitting one transport block to the mobile station device in the cell in the transmission mode in a certain subframe and having determined that the spatial bundling is executed on the ACKs or NACKs for the cell in the transmission mode by the mobile station device, an ACK or a NACK is generated by the mobile station device in response to the one transmitted transport block in the cell in the transmission mode in the certain subframe and a NACK is not generated by the mobile station device in response to a transport block which has not been received in the cell in the transmission mode in the certain subframe.

5. A wireless communication system, comprising:
a mobile station device; and
a base station device configured to, programmed to, or configured to and programmed to communicate with the mobile station device by using a plurality of cells which are aggregated, wherein
the mobile station device is configured to, programmed to, or configured to and programmed to:
generate a plurality of Acknowledgment/Negative-Acknowledgment (ACK/NACK) sequences by interleaving, together, a scheduling request and a plurality of ACKs/NACKs for a plurality of cells and a plurality of subframes,
separately encode the plurality of ACK/NACK sequences by using a single set of base sequences, and
transmit the plurality of encoded ACK/NACK sequences on a physical uplink control channel in a subframe; and
the base station device is configured to, programmed to, or configured to and programmed to receive the plurality of encoded ACK/NCAK sequences from the mobile station device using the physical uplink control channel in the subframe.

6. A wireless communication system, comprising:
a mobile station device; and
a base station device configured to, programmed to, or configured to and programmed to perform, using a single physical channel, communication of Acknowledgements or Negative Acknowledgements (ACKs or NACKs) corresponding to individual transport blocks received in one or a plurality of subframes in a plurality of cells, wherein
the base station device is further configured to, programmed to, or configured to and programmed to set a transmission mode for at least one of the plurality of cells, the transmission mode enabling two transport blocks to be transmitted in one subframe using spatial multiplexing, and
the mobile station device is configured to, programmed to, or configured to and programmed to determine, in accordance with the number of bits of the ACKs or NACKs, whether or not to execute spatial bundling on ACKs or NACKs for the cell in the transmission mode, wherein
in a case of receiving one transport block in the cell in the transmission mode in a certain subframe and having determined not to execute the spatial bundling on the ACKs or NACKs for the cell in the transmission mode, generate an ACK or a NACK in response to the received one transport block in the cell in the transmission mode in the certain subframe and generate a NACK in response to a transport block which has not been received in the cell in the transmission mode in the certain subframe by the mobile station device, and
in a case of receiving one transport block in the cell in the transmission mode in a certain subframe and having determined to execute the spatial bundling on the ACKs or NACKs for the cell in the transmission mode, generate an ACK or a NACK in response to the received one transport block in the cell in the transmission mode in the certain subframe and not generating a NACK in response to a transport block which has not been received in the cell in the transmission mode in the certain subframe by the mobile station device.

7. A wireless communication method used for a mobile station device configured to, programmed to, or configured to and programmed to communicate with a base station device by using a plurality of cells which are aggregated, the wireless communication method comprising:
generating a plurality of Acknowledgments/Negative-Acknowledgments (ACK/NACK) sequences by interleaving, together, a scheduling request and a plurality of ACKs/NACKs for a plurality of cells and a plurality of subframes;
separately encoding the plurality of ACK/NACK sequences by using a single set of base sequences; and
transmitting the encoded ACK/NACK sequences on a physical uplink control channel in a subframe.

8. A wireless communication method used for a mobile station device configured to, programmed to, or configured to and programmed to transmit using a single physical channel, to a base station device, Acknowledgments or Negative-Acknowledgments (ACKs or NACKs) corresponding to individual transport blocks received in one or a plurality of subframes in a plurality of cells, a transmission mode being set for at least one of the plurality of cells by the base station device, the transmission mode enabling two transport blocks to be transmitted in one subframe using spatial multiplexing, the wireless communication method comprising:
determining, in accordance with the number of bits of the ACKs or NACKs, whether or not to execute spatial bundling on ACKs or NACKs for the cell in the transmission mode; and
transmitting the ACKs and/or NACKs, wherein
in a case that one transport block is received in the cell in the transmission mode in a certain subframe and it is determined that the spatial bundling is not to be executed on the ACKs or NACKs for the cell in the transmission mode, generating an ACK or a NACK in response to the received one transport block in the cell in the transmission mode in the certain subframe and generating a NACK in response to a transport block which has not been received in the cell in the transmission mode in the certain subframe by the mobile station device; and
in a case that one transport block is received in the cell in the transmission mode in a certain subframe and it is determined that the spatial bundling is to be executed on the ACKs or NACKs for the cell in the transmission mode, generating an ACK or a NACK in response to the received one transport block in the cell in the transmission mode in the certain subframe and not generating a NACK in response to a transport block which has not been received in the cell in the transmission mode in the certain subframe by the mobile station device.

9. A wireless communication method used for a base station device configured to, programmed to, or configured to and programmed to communicate with a mobile station device by using a plurality of aggregated cells, the wireless communication method comprising:
receiving a plurality of encoded Acknowledgments/Negative-Acknowledgments (ACK/NACK) sequences transmitted on a physical uplink control channel, the plurality of encoded ACK/NACK sequences being generated by interleaving, together, a scheduling request and a plurality of ACKs/NACKs for a plurality of cells and a plurality of subframes to generate the plurality of ACK/NACK sequences, and separately encoding the plurality of ACK/NACK sequences by using a single set of base sequences; and
separately decoding the plurality of encoded ACK/NACK sequences.

10. A wireless communication method used for a base station device configured to, programmed to, or configured to and programmed to receive using a single physical channel, from a mobile station device, Acknowledgments or Negative-Acknowledgments (ACKs or NACKs) corresponding to individual transport blocks transmitted in one or a plurality of subframes in a plurality of cells, a transmission mode being set for at least one of the plurality of cells by the base station device, the transmission mode enabling two transport blocks to be transmitted in one subframe using spatial multiplexing, the wireless communication method comprising:
determining in accordance with the number of bits of the ACKs and/or NACKs, whether or not spatial bundling on ACKs or NACKs for the cell in the transmission mode is executed; and
receiving the ACKs and/or NACKs, wherein, in a case that the base station device transmits one transport block in the cell in the transmission mode in a certain subframe and it is determined that the spatial bundling is not to be executed on the ACKs or NACKs for the cell in the transmission mode by the mobile station device, an ACK or a NACK is generated by the mobile station device in response to the one transmitted transport block in the cell in the transmission mode in the certain subframe and a NACK is generated by the mobile station device in response to a transport block which has not been received in the cell in the transmission mode in the certain subframe, and in a case that the base station device transmits one transport block in the cell in the transmission mode in a certain subframe and it is determined that the spatial bundling is to be executed on the ACKs or NACKs for the cell in the transmission mode by the mobile station device, an ACK or a NACK is generated by the mobile station device in response to the one transmitted transport block in the cell in the transmission mode in the certain subframe and a NACK is not generated by the mobile station device in response to a transport block which has not been received in the cell in the transmission mode in the certain subframe by the mobile station device.

11. An integrated circuit mountable on a mobile station device configured to, programmed to, or configured to and programmed to communicate with a base station device by using a plurality of cells which are aggregated, the integrated circuit comprising:

an ACK/NACK sequence generator configured to generate a plurality of Acknowledgments/Negative-Acknowledgments (ACK/NACK) sequences by interleaving, together, a scheduling request and a plurality of ACKs/NACKs for a plurality of cells and a plurality of subframes;

a sequence encoder configured to separately encode, by using a single set of base sequences, the plurality of ACK/NACK sequences; and a transmitter configured to transmit the plurality of encoded ACK/NACK sequences on a physical uplink control channel in a subframe.

12. An integrated circuit mountable on a mobile station device configured to, programmed to, or configured to and programmed to transmit on a single physical channel, to a base station device, Acknowledgments or Negative-Acknowledgments (ACKs or NACKs) corresponding to individual transport blocks received in one or a plurality of subframes in a plurality of cells, a transmission mode being set for at least one of the plurality of cells by the base station device, the transmission mode enabling two transport blocks to be transmitted in one subframe using spatial multiplexing, the integrated circuit comprising:

a bundling determination circuit configured to determine, in accordance with the number of bits of the ACKs or NACKs, whether or not to execute spatial bundling on ACKs or NACKs for the cell in the transmission mode;

a transmitter configured to transmit the ACKs and/or NACKs; and an ACK/NACK generated configured to:
in a case that one transport block is received in the cell in the transmission mode in a certain subframe, generate an ACK or a NACK in response to the received one transport block in the cell in the transmission mode in the certain subframe, and to generate a NACK in response to a transport block which has not been received in the cell in the transmission mode in the certain subframe in a case that it is determined that the spatial bundling is not to be executed on the ACKs or NACKs for the cell in the transmission mode in the certain subframe; and in a case that one transport block is received in the cell in the transmission mode in a certain subframe and it is determined that the spatial bundling is to be executed on the ACKS or NACKS for the cell in the transmission mode, generate an ACK or a NACK in response to the received one transport block in the cell in the transmission mode in the certain subframe, and not generating a NACK in response to a transport block which has not been received in the cell in the transmission mode in the certain subframe by the mobile station device.

13. An integrated circuit mountable on a base station device configured to, programmed to, or configured to and programmed to communicate with a mobile station device by using a plurality of cells which are aggregated, the integrated circuit comprising:

a receiver configured to receive a plurality of encoded Acknowledgments/Negative-Acknowledgments (ACK/NACK) sequences and which is transmitted on a physical uplink control channel, the plurality of encoded ACK/NACK sequences being generated by, with the mobile station device, interleaving, together, a scheduling request and a plurality of ACKs/NACKs for a plurality of cells and a plurality of subframes to generate the plurality of ACK/NACK sequences, and separately encoding the plurality of ACK/NACK sequences by using a single set of base sequences; and a decoder configured to separately decode the plurality of encoded ACK/NACK sequences.

14. An integrated circuit mountable on a base station device configured to, programmed to, or configured to and programmed to receive on a single physical channel, from a mobile station device, Acknowledgments or Negative-Acknowledgments (ACKs or NACKs) corresponding to individual transport blocks transmitted in one or a plurality of subframes in a plurality of cells, a transmission mode being set for at least one of the plurality of cells by the base station device, the transmission mode enabling two transport blocks to be transmitted in one subframe using spatial multiplexing, the integrated circuit comprising:

a bundling determiner configured to determine, in accordance with the number of bits of the ACKs and/or NACKs, whether or not spatial bundling on ACKs or NACKs for the cell in the transmission mode is executed; and a receiver configured to receive the ACKs and/or NACKs, wherein in a case that the base station device transmits one transport block in the cell in the transmission mode in a certain subframe, and it is determined that the spatial bundling is not to be executed on the ACKs or NACKs for the cell in the transmission mode by the mobile station device, an ACK or a NACK is generated by the mobile station device in response to the one transmitted transport block in the cell in the transmission mode in the certain subframe and a NACK is generated by the mobile station device in response to a transport block which has not been received by the mobile station device in the cell in the transmission mode in the certain subframe, and in a case that the base station device transmits one transport block in the cell in the transmission mode in a certain subframe and it is determined that the spatial bundling is to be executed on the ACKs or NACKs for the cell in the transmission mode by the mobile station device, an ACK or a NACK is generated by the mobile station device in response to the one transmitted transport block in the cell in the transmission mode in the certain subframe and a NACK is not generated by the mobile station device in response to a transport block which has not been received by the mobile station device in the cell in the transmission mode in the certain subframe.

* * * * *